US012501028B2

(12) United States Patent
Kang et al.

(10) Patent No.: US 12,501,028 B2
(45) Date of Patent: *Dec. 16, 2025

(54) METHOD AND DEVICE FOR ENCODING/DECODING IMAGE USING GEOMETRICALLY MODIFIED PICTURE

(71) Applicants: Electronics and Telecommunications Research Institute, Daejeon (KR); University-Industry Cooperation Group of Kyung Hee University, Yongin-si (KR)

(72) Inventors: Jung Won Kang, Daejeon (KR); Hyun Suk Ko, Daejeon (KR); Sung Chang Lim, Daejeon (KR); Jin Ho Lee, Daejeon (KR); Dong San Jun, Daejeon (KR); Hui Yong Kim, Daejeon (KR); Gwang Hoon Park, Seongnam-si (KR); Jin Soo Choi, Daejeon (KR); Tae Hyun Kim, Hwaseong-si (KR); Dae Young Lee, Ansan-si (KR); Young Su Heo, Suwon-si (KR)

(73) Assignees: Electronics and Telecommunications Research Institute, Daejeon (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,773

(22) Filed: Sep. 4, 2024

(65) Prior Publication Data
US 2024/0430405 A1 Dec. 26, 2024

Related U.S. Application Data

(60) Division of application No. 18/737,694, filed on Jun. 7, 2024, now Pat. No. 12,323,586, which is a division
(Continued)

(30) Foreign Application Priority Data
Nov. 20, 2015 (KR) .................. 10-2015-0163246

(51) Int. Cl.
H04N 19/105 (2014.01)
G06T 3/02 (2024.01)
(Continued)

(52) U.S. Cl.
CPC ............ H04N 19/105 (2014.11); G06T 5/50 (2013.01); G06T 5/80 (2024.01); G06T 7/248 (2017.01);
(Continued)

(58) Field of Classification Search
CPC .. H04N 19/105; H04N 19/137; H04N 19/139; H04N 19/159; H04N 19/172;
(Continued)

(56) References Cited

U.S. PATENT DOCUMENTS

2010/0208827 A1 8/2010 Divorra Escoda et al.
2012/0106627 A1 5/2012 Guo et al.
(Continued)

FOREIGN PATENT DOCUMENTS

CN 101213840 A 7/2008
CN 101227601 A 7/2008
(Continued)

OTHER PUBLICATIONS

Huang, Han et al., (2013) "Control-Point Representation and Differential Coding Affine-Motion Compensation," IEEE Transactions on Circuits and Systems for Video Technology. doi: 10.1109/TCSVT.2013.2254977.
(Continued)

*Primary Examiner* — Matthew K Kwan
(74) *Attorney, Agent, or Firm* — BROADVIEW IP LAW, PC

(57) ABSTRACT

The present invention relates to a method and apparatus for video encoding/decoding by using a geometric modified picture. The encoding method according to the present invention includes: generating a geometric modified picture by geometrically modifying a reference picture; and generating a first prediction block of a current block by perform-
(Continued)

ing inter prediction referencing the geometric modified picture.

8 Claims, 33 Drawing Sheets

Related U.S. Application Data of application No. 18/358,871, filed on Jul. 25, 2023, now Pat. No. 12,041,226, which is a continuation of application No. 17/820,539, filed on Aug. 17, 2022, now Pat. No. 11,758,128, which is a continuation of application No. 17/221,195, filed on Apr. 2, 2021, now Pat. No. 11,425,370, which is a continuation of application No. 15/776,292, filed as application No. PCT/KR2016/013364 on Nov. 18, 2016, now Pat. No. 11,412,209.

(51) Int. Cl.

| | | |
|---|---|---|
| *G06T 5/50* | (2006.01) | |
| *G06T 5/80* | (2024.01) | |
| *G06T 7/246* | (2017.01) | |
| *H04N 19/137* | (2014.01) | |
| *H04N 19/139* | (2014.01) | |
| *H04N 19/159* | (2014.01) | |
| *H04N 19/172* | (2014.01) | |
| *H04N 19/174* | (2014.01) | |
| *H04N 19/176* | (2014.01) | |
| *H04N 19/51* | (2014.01) | |
| *H04N 19/513* | (2014.01) | |

(52) U.S. Cl.
CPC ......... *H04N 19/137* (2014.11); *H04N 19/139* (2014.11); *H04N 19/159* (2014.11); *H04N 19/172* (2014.11); *H04N 19/176* (2014.11); *H04N 19/51* (2014.11); *H04N 19/521* (2014.11); *G06T 3/02* (2024.01); *H04N 19/174* (2014.11)

(58) Field of Classification Search
CPC .... H04N 19/176; H04N 19/51; H04N 19/521; H04N 19/174; H04N 19/103; H04N 19/107; H04N 19/182; H04N 19/29; H04N 19/44; H04N 19/586; H04N 19/50; G06T 5/50; G06T 5/80; G06T 7/248; G06T 3/02
USPC ...................................................... 375/240.02
See application file for complete search history.

(56) References Cited

U.S. PATENT DOCUMENTS

| | | |
|---|---|---|
| 2015/0016548 A1 | 1/2015 | Lee et al. |
| 2015/0092851 A1 | 4/2015 | Yoshikawa et al. |
| 2016/0029029 A1 | 1/2016 | Lee et al. |

FOREIGN PATENT DOCUMENTS

| | | |
|---|---|---|
| CN | 101641954 A | 2/2010 |
| CN | 103039075 A | 4/2013 |
| CN | 103069802 A | 4/2013 |
| CN | 104053001 A | 9/2014 |
| CN | 104602003 A | 5/2015 |
| CN | 104718756 A | 6/2015 |
| JP | 2000-32456 A | 1/2000 |
| JP | 2004-364333 A | 12/2004 |
| JP | 2012-80151 A | 4/2012 |
| KR | 10-0832672 B1 | 5/2008 |
| KR | 10-2009-0067178 A | 6/2009 |
| KR | 10-2015-0042164 A | 4/2015 |
| TW | 201440503 A | 10/2014 |
| WO | 2010/090335 A1 | 8/2010 |
| WO | 2011/013253 A1 | 2/2011 |
| WO | 2013/105946 A1 | 7/2013 |

OTHER PUBLICATIONS

Lin, S., et al. "Affine transform prediction for next generation video coding," *MPEG doc. m37525 and ITU-T SG16 Doc. COM16-C1016* (2015). (11 pages, in English).

FIG. 14

$p' = Hp$ $$H = \begin{bmatrix} h_1 & h_2 & h_3 \\ h_4 & h_5 & h_6 \\ h_7 & h_8 & h_9 \end{bmatrix} \qquad p = \begin{bmatrix} x \\ y \\ 1 \end{bmatrix} \quad p' = \begin{bmatrix} x' \\ y' \\ 1' \end{bmatrix}$$

$$x' = \frac{h_1 x + h_2 y + h_3}{h_7 x + h_8 y + h_9}$$

$$y' = \frac{h_4 x + h_5 y + h_6}{h_7 x + h_8 y + h_9}$$

$\xrightarrow{k_n = h_n/h_9}$ $$x' = \frac{k_1 x + k_2 y + k_3}{k_7 x + k_8 y + 1}$$

$$y' = \frac{k_4 x + k_5 y + k_6}{k_7 x + k_8 y + 1}$$

$\Rightarrow$ $k_1 x + k_2 y + k_3 - k_7 xx' - k_8 yx' = x'$ $k_4 x + k_5 y + k_6 - k_7 xx' - k_8 yx' = y'$

FIG. 15

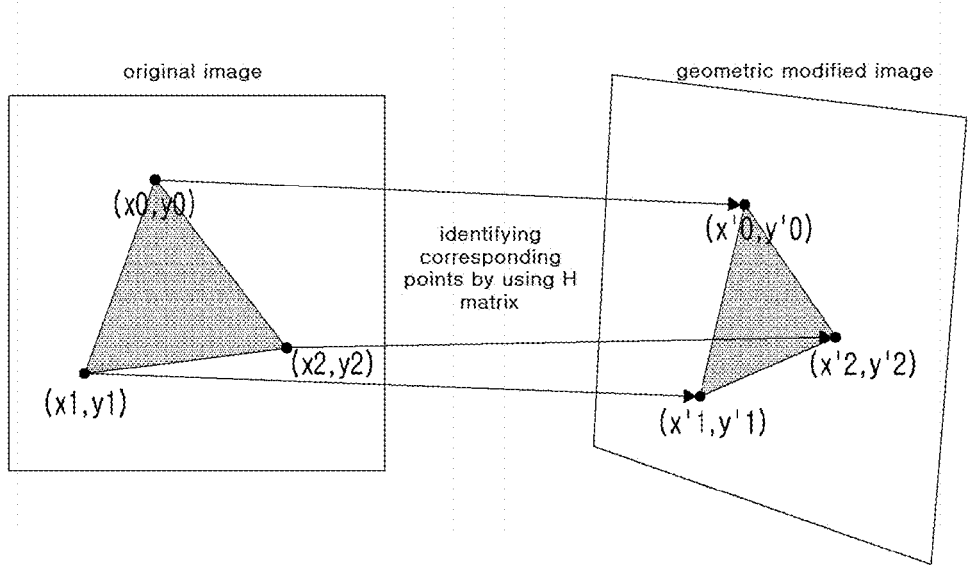

$x' = f(x, y, \alpha)$
$y' = g(x, y, \beta)$ $\Rightarrow \begin{bmatrix} x' \\ y' \\ 1 \end{bmatrix} = H \begin{bmatrix} x \\ y \\ 1 \end{bmatrix} \qquad H = \begin{bmatrix} h_1 & h_2 & h_3 \\ h_4 & h_5 & h_6 \\ h_7 & h_8 & h_9 \end{bmatrix}$

FIG. 27

(1) $A = \begin{pmatrix} 1.7 & 1.2 & 5.6 \\ 3.3 & 21.2 & 7.7 \\ 12.1 & 23 & 1.5 \end{pmatrix} \Rightarrow A' = \begin{pmatrix} 2 & 1 & 6 \\ 3 & 21 & 7 \\ 12 & 23 & 2 \end{pmatrix}$ (2) $A = \begin{pmatrix} 1.7 & 1.2 & 5.6 \\ 3.3 & 21.2 & 7.7 \\ 0.1 & 0.7 & 1 \end{pmatrix} \Rightarrow A' = \begin{pmatrix} 1.7 & 1.2 & 5.6 \\ 3.3 & 21.2 & 7.7 \end{pmatrix}$ (3) $A = \begin{pmatrix} 2 & 1 & 5 \\ 3 & 2 & 1 \\ 0.1 & 0.7 & 1 \end{pmatrix} \rightarrow \boxed{B = 2A} \rightarrow B = \begin{pmatrix} 4 & 2 & 10 \\ 6 & 4 & 2 \\ 0.2 & 1.4 & 2 \end{pmatrix}$ (4) $A = \begin{pmatrix} 2 & 1 & 5 \\ 3 & 2 & 1 \\ 0.1 & 0.7 & 1 \end{pmatrix}, B_d = \begin{pmatrix} 0 & 0 & 0 \\ 0 & 2 & -1 \\ 0 & 1 & 0 \end{pmatrix} \rightarrow \boxed{B = A + B_d} \rightarrow B = \begin{pmatrix} 2 & 1 & 5 \\ 3 & 4 & 0 \\ 0.1 & 1.7 & 1 \end{pmatrix}$

FIG. 36
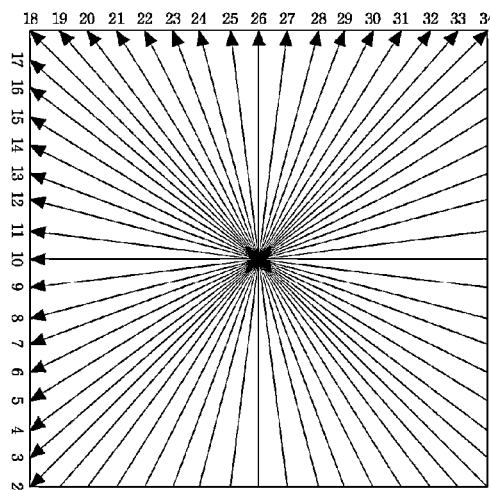
(1)
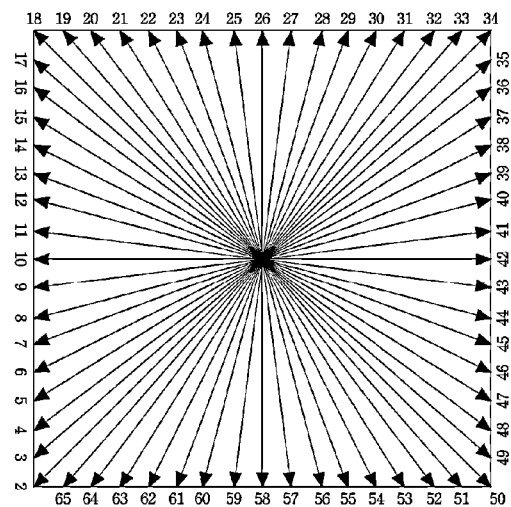
(2)

METHOD AND DEVICE FOR ENCODING/DECODING IMAGE USING GEOMETRICALLY MODIFIED PICTURE

CROSS REFERENCE TO RELATED APPLICATION(S)

This application is a division of U.S. application Ser. No. 18/737,694, filed on Jun. 7, 2024, which is a division of U.S. application Ser. No. 18/358,871, filed on Jul. 25, 2023, now Granted U.S. Pat. No. 12,041,226, issued Jul. 16, 2024, which is a continuation of U.S. application Ser. No. 17/820,539, filed on Aug. 17, 2022, now Granted U.S. Pat. No. 11,758,128 issued Sep. 12, 2023, which is a continuation of U.S. application Ser. No. 17/221,195, filed on Apr. 2, 2021, now Granted U.S. Pat. No. 11,425,370 issued Aug. 23, 2022, which is a continuation of U.S. application Ser. No. 15/776,292, filed on May 15, 2018, now Granted U.S. Pat. No. 11,412,209 issued Aug. 9, 2022, which is a U.S. National Stage Application of International Application No. PCT/KR2016/013364, filed on Nov. 18, 2016, which claims the benefit under 35 USC 119(a) and 365(b) of Korean Patent Application No. 10-2015-0163246, filed on Nov. 20, 2015, in the Korean Intellectual Property Office.

TECHNICAL FIELD

The present invention relates generally to a method and apparatus for encoding/decoding an image by using a geometrically modified picture generated by geometrically modifying a reference picture.

BACKGROUND ART

As High Definition (HD) broadcasting is extended and provided nationwide and worldwide, many users have become accustomed to images having high resolution and high picture quality. Accordingly, many institutions are providing an impetus for the development of the next-image device. Furthermore, as there is a growing interest in Ultra High Definition (UHD), which has a resolution four times higher than HDTV, there is a need for technology in which an image having higher resolution and higher picture quality can be compressed and processed.

As an image compression technology, there are various technologies such as inter prediction technology in which pixel values included in a current picture are predicted from pictures before or after the current picture, an intra-prediction technology in which pixel values included in a current picture are predicted using pixel information in the current picture, a transformation and quantization technology for compressing energy of residual signals, and an entropy encoding technology in which a short code is allocated to a value having high appearance frequency and a long code is allocated to a value having low appearance frequency. The image data may be transmitted and stored in a state in which it is effectively compressed using these image compression technologies.

When a global motion is included in a reference picture that is referenced during inter prediction, similarity between the reference picture and a current picture is lowered. The lowered similarity between the reference picture and the current picture may cause a degradation of prediction efficiency. And, when performing intra prediction, as prediction direction of the intra prediction of the current block is restricted, efficiency of the intra prediction may be deteriorated. Therefore, improvements to solve the above problems are required.

DISCLOSURE

Technical Problem

The present invention is intended to propose a method and apparatus for efficiently encoding/decoding an image.

In addition, the present invention provides a method and apparatus for efficiently performing intra prediction and/or inter prediction.

In addition, the present invention provides a method and apparatus for generating a geometric modified picture by geometrically modifying a reference picture.

In addition, the present invention provides a method and apparatus for efficiently signaling information related to a geometric modified picture.

In addition, the present invention provides a method and apparatus for performing intra prediction and/or inter prediction by referencing a geometric modified picture.

Technical Solution

According to one aspect of the present invention, there is provided a method for encoding an image. The method may comprise generating a geometric modified picture by geometrically modifying a reference picture; and generating a first prediction block of a current block by performing inter prediction referencing the geometric modified picture.

According to the encoding method of the present invention, the method may further comprise: generating a second prediction block of the current block by performing inter prediction referencing the reference picture; and selecting a final prediction block being used for motion compensation of the current block from the first and second prediction blocks.

According to the encoding method of the present invention, the final prediction block may be selected by selecting one among the first and second prediction blocks having fewer errors between the current block.

According to the encoding method of the present invention, the method may further comprise generating geometric modification information that is used to generate the geometric modified picture. And the generating the geometric modified picture may be performed based on the geometric modification information and the reference picture.

According to the encoding method of the present invention, the method may further comprise encoding the geometric modification information.

According to the encoding method of the present invention, encoding the geometric modification information may comprise reconfiguring the geometric modification information, and the reconfiguring the geometric modification information may comprise simplifying or predicting the geometric modification information.

According to the encoding method of the present invention, the geometric modification information may be generated based on a change in pixel information between a current picture including the current block and the reference picture.

According to the encoding method of the present invention, the geometric modification information may be generated based on matching information between feature points that are extracted from each of the current picture and the reference picture.

According to the encoding method of the present invention, the generating the geometric modified picture may comprise: identifying one point within the reference picture, the point corresponding to one point within the geometric modified picture; and setting pixel information of the corresponding point within the reference picture to pixel information of the point within the geometric modified picture.

According to the encoding method of the present invention, when the point corresponding to the point within the geometric modified picture is not present within the reference picture, a point closest to the corresponding point within the reference picture may be identified as the corresponding point.

According to another aspect of the present invention, there is provided a method for decoding an image. The method may comprise generating a geometric modified picture by geometrically modifying a reference picture; and generating a prediction block of a current bock by performing inter prediction referencing the geometric modified picture.

According to the decoding method of the present invention, the method may further comprise: receiving motion compensation related information; and determining whether or not the geometric modified picture is used for motion compensation of the current block based on the motion compensation related information, and at the determining, when the geometric modified picture is determined to be referenced for motion compensation of the current block, the generating the geometric modified picture and the generating the prediction block may be performed.

According to the decoding method of the present invention, the determining may be performed based on whether or not the motion compensation related information includes geometric modification information or based on information on whether a geometric modified picture is referenced, the information being included in the motion compensation related information.

According to the decoding method of the present invention, when the geometric modified picture is determined to be referenced in motion compensation of the current block at the determining, the method may further comprise reconstructing the geometric modification information based on information on the geometric modification information included in the motion compensation related information, and the generating the geometric modified picture may be performed based on the reference picture and the reconstructed geometric modification information.

According to the decoding method of the present invention, the information on the geometric modification information may include residual geometric modification information or a scaling coefficient, and at the reconstructing the geometric modification information may be performed based on at least one of the residual geometric modification information and the scaling coefficient, and previously stored geometric modification information.

According to the decoding method of the present invention, the motion compensation related information may comprise information on the previously stored geometric modification information, and the information on the previously stored geometric modification information may be information identifying one among one or more previously stored geometric modification information.

According to the decoding method of the present invention, the generating the geometric modified picture may comprise: identifying one point within the reference picture, the point corresponding to one point within the geometric modified picture; and setting pixel information of the corresponding point within the reference picture to pixel information of the point within the geometric modified picture.

According to the decoding method of the present invention, when the point corresponding to the point within the geometric modified picture is not present within the reference picture, a point closest to the corresponding point within the reference picture may be identified as the corresponding point.

According to the decoding method of the present invention, when the corresponding point within the reference picture has a real number coordinate, one or more points each having an integer number coordinate and neighboring to the corresponding point within the reference picture may be identified, and pixel information of the corresponding point within the reference picture may be derived based on pixel information of the one or more points each having the integer number coordinate.

According to the decoding method of the present invention, the generating the geometric modified picture may be performed in at least one unit of a picture, a slice, a tile, a coding unit, and a prediction unit.

Advantageous Effects

According to the present invention, an image may be efficiently encoded/decoded.

In addition, according to the present invention, inter prediction and/or intra prediction may be efficiently performed.

Further, according to the present invention, a geometric modified picture may be generated by geometrically modifying a reference picture.

In addition, according to the present invention, information related to a geometric modified picture may be efficiently signaled.

Further, according to the present invention, intra prediction and/or inter prediction may be performed by referencing a geometric modified picture.

DESCRIPTION OF DRAWINGS

FIG. 14 is an example method of deriving a relational formula between two points corresponding between two images according to the present invention.

FIG. 15 is a diagram showing a method of generating a geometrically modified image based on a geometric modification matrix and an original image according to the present invention.

FIG. 27 is a diagram showing various examples for modifying geometric modification information to reduce a bit amount used for encoding the geometric modification information.

FIG. 36 is a diagram showing an intra-prediction direction according to the present invention.

MODE FOR INVENTION

Figure 1:
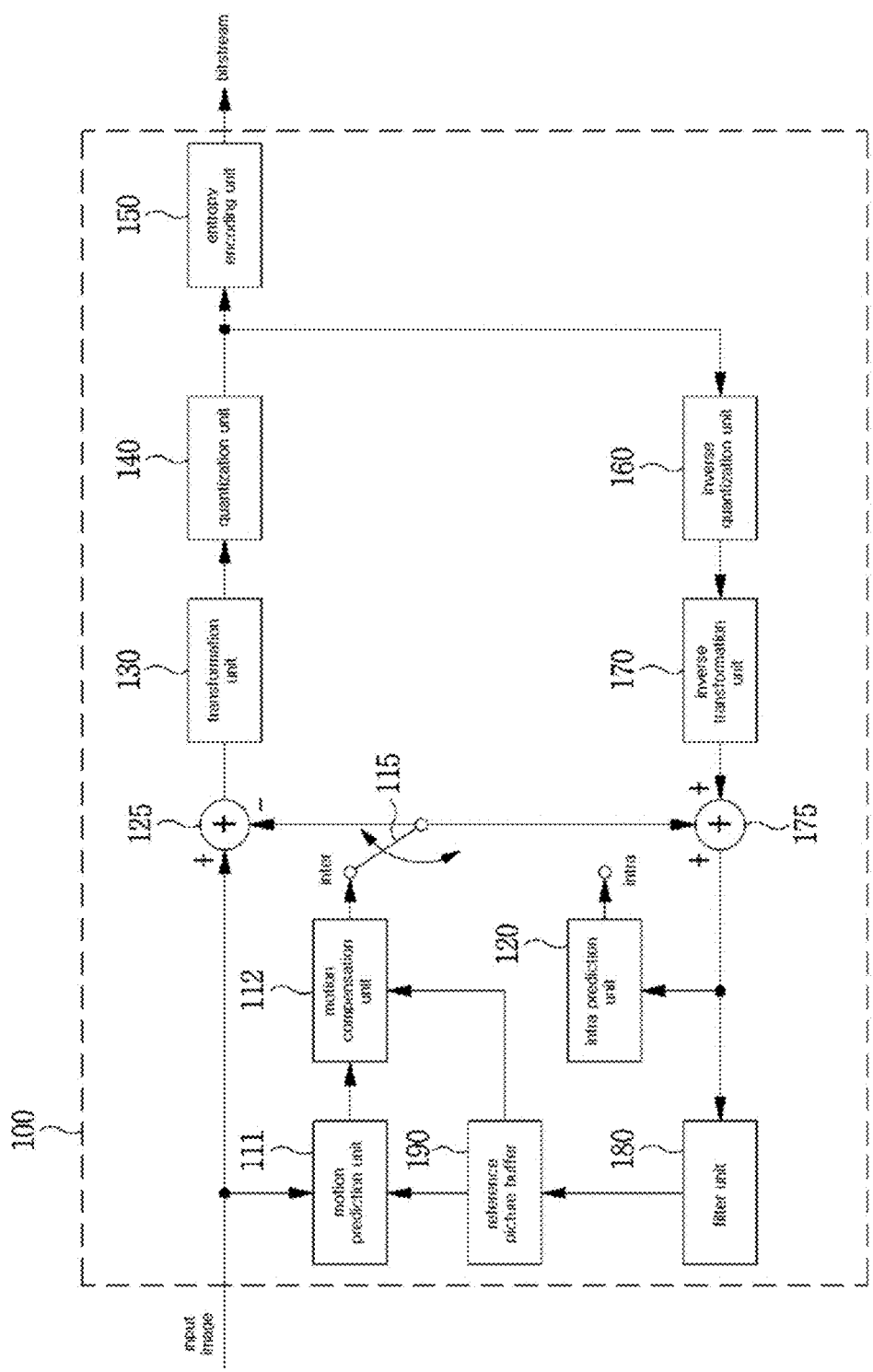
FIG. 1 is a block diagram showing a configuration of an image encoding apparatus to which an embodiment of the present invention is applied.

Since a variety of modifications may be made to the present invention and there are various embodiments of the present invention, examples will now be provided with reference to drawings and will be described in detail. However, the present invention is not limited thereto, and the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity, and the same reference numerals will be used throughout to designate the same or like elements. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention and the 'second' component may also be similarly named the 'first' component. The term 'and/or' includes a combination of a plurality of items or any one of a plurality of terms.

When an element is mentioned to be "coupled" or "connected" to another element, this may mean that it is directly coupled or connected to the other element, but it is to be understood that yet another element may exist in-between. On the other hand, when an element is mentioned to be "directly coupled" or "directly connected" to another element, it is to be understood that there are no other elements in-between.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may refer to a picture configuring a video, or may refer to a video. For example, "encoding and/or decoding an image" may refer to "encoding and/or decoding a video", or may refer to "encoding and/or decoding a single image among images configuring a video". Herein, the picture may refer to an image.

Encoder: may refer to an encoding apparatus.

Decoder: may refer to a decoding apparatus.

Parsing: may refer to determining a syntax element value by performing entropy decoding, or may refer to an entropy decoder.

Block: may refer to a sample of an M×N matrix, herein, M and N are positive integers. A block may refer to a sample matrix of a two dimensional matrix.

Unit: may refer to a unit of encoding or decoding an image. When encoding and decoding an image, a unit may be an area generated by partitioning an image. Alternatively, a unit may refer to a divided unit of one image when the image is sub-divided and encoded or decoded. While encoding and decoding, a predetermined process may be performed for each unit. A single unit may be divided into smaller sub-units. The unit may also refer to a block, a macro block (MB), a coding unit (CU), a prediction unit (PU), a transform unit (TU), a coding block (CB), a prediction block (PB), or a transform block (TB) according to a function thereof. The unit may refer to a luma component block to be distinguished from the block, a chroma component block in response to the luma component block, and may refer to each block including a syntax element thereof. The unit may have various sizes and shapes. In particular, the shape of the unit may include two-dimensional forms such as a rectangle, cube, trapezoid, triangle, pentagon, etc. In addition, the shape of the unit may include a geometrical figure. Further, unit information may include at least one of a unit type such as encoding unit, prediction unit, transform unit, etc., a unit size, a unit depth, and a sequence of unit encoding and decoding, etc.

Reconstructed neighbor unit: may refer to a reconstructed unit that is already spatially/temporally encoded or decoded, and adjacent to an encoding/decoding target unit.

Depth: indicates a degree of partitions of a unit. In a tree structure, the highest node may refer to a root node, and the lowest node may refer to a leaf node.

Symbol: may refer to a syntax element and a coding parameter of an encoding/decoding target unit, a value of transform coefficient, etc.

Parameter set: may correspond to header information in a structure within a bit stream. At least one of a video parameter set, a sequence parameter set, a picture parameter set, and an adaptation parameter set may be included in the parameter set. In addition, the parameter set may include information of a slice header and a tile header.

Bitstream: may refer to a bit string including encoded image information.

Coding parameter: may include not only information encoded by an encoder and then transmitted to a decoder along with a syntax element, but also information that may be derived in an encoding or decoding process, or may refer to a parameter necessary for encoding and decoding. For example, the coding parameter may include at least one value and/or statistic of an intra-prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, a unit size, unit partition information, etc.

Prediction unit: may refer to a basic unit when performing inter prediction or intra prediction, and when performing compensation for the prediction. The prediction unit may be divided into multiple partitions. Each of the partitions may also be the basic unit when performing inter prediction or intra prediction, and when performing the compensation for the prediction. The partitioned prediction unit may also refer to a prediction unit. In addition, a single prediction unit may be divided into smaller sub-units. The prediction unit may have various sizes and shapes. In particular, the shape of the unit may include two dimensional forms such as a rectangle, cube, trapezoid, triangle, pentagon, etc. In addition, the shape of the unit may include a geometrical figure.

Prediction unit partition: may refer to a partitioning form of a prediction unit.

Reference picture list: may refer to a list including at least one reference picture that is used for inter prediction or motion compensation. Types of the reference list may include a list combined (LC), L0 (List 0), L1 (List 1), L2 (List 2), L3 (List 3), etc. At least one reference picture list may be used for inter prediction.

Inter-prediction indicator: may refer to an inter-prediction direction (uni-direction prediction, bi-direction prediction) of an encoding/decoding target block. Alternatively, the indicator may refer to a number of reference pictures used for generating a prediction block of the encoding/decoding target block, or may refer to a number of prediction blocks used when the encoding/decoding target block performs motion compensation.

Reference picture index: may refer to an index of a specific picture within a reference picture list.

Reference picture: may refer to a reference picture that is referenced by a specific unit used for inter prediction or motion compensation. Alternately, a reference image may refer to a reference picture.

Motion vector: refers to a two-dimensional matrix used for inter prediction or motion compensation, or may be an offset between an encoding/decoding target image and a reference image. For example, (mvX, mvY) may indicate a moving vector, mvX may be a horizontal component, and mvY may be vertical component.

Motion vector candidate: may refer to a unit that becomes a prediction candidate when predicting a motion vector, or may refer to a moving vector of the unit.

Motion vector candidate list: may refer to a list configured with a moving vector candidate.

Motion vector candidate index: may refer to an indicator that indicates a motion vector candidate within a moving vector candidate list, or may refer to an index of a motion vector predictor.

Motion information: may refer to information including at least one of a motion vector, a reference image index, an inter-prediction indicator, reference image list information, a reference image, a motion vector candidate, a motion vector candidate index, etc.

Transform unit: may refer to a basic unit when performing encoding/decoding of a residual signal such as transform, inverse transform, quantization, inverse quantization, and encoding/decoding of transform coefficient. A single unit may be divided into smaller sub-units. The unit may have various sizes and shapes. In particular, the shape of the unit may include a two-dimensional form such as a rectangle, cube, trapezoid, triangle, pentagon, etc. In addition, the shape of the unit may also include a geometrical figure.

Scaling: may refer to a process of multiplying a factor to a transform coefficient level, and as a result, a transform coefficient may be generated. The scaling may also refer to a inverse quantization.

Quantization parameter: may refer to a value used for scaling a transform coefficient level in a quantization and inverse quantization. Herein, a quantization parameter may be a value mapped to a step size of the quantization.

Delta quantization parameter: may refer to a residual value between a predicted quantization parameter and a quantization parameter of an encoding/decoding target unit.

Scan: may refer to a method of sorting coefficient orders within a block or a matrix. For example, sorting a two-dimensional matrix to a one dimensional matrix may refer to scanning or inverse scanning.

Transform coefficient: may be a coefficient value generated after performing a transform. In the present invention, a transform coefficient level that is quantized by applying a quantization to a transform coefficient may be included in the transform coefficient.

Non-zero transform coefficient: may refer to a transform coefficient in which a value thereof or a size thereof is not 0.

Quantization matrix: may refer to a matrix used for quantization and inverse quantization in order to improve quality of an image. The quantization matrix may also refer to a scaling list.

Quantization matrix coefficient: may refer to each element of a quantization matrix. The quantization matrix coefficient may also refer to a matrix coefficient.

Default matrix: may refer to a predetermined quantization matrix defined in an encoder and a decoder in advance.

Non-default matrix: may refer to a quantization matrix transmitted from/received by a user, and is not defined in an encoder and a decoder in advance.

FIG. 1 is a block diagram showing a configuration of an image encoding apparatus to which an embodiment of the present invention is applied.

The encoding apparatus 100 may be a video encoding apparatus or an image encoding apparatus. A video may include at least one image. The encoding apparatus 100 may encode the at least one image of the video in order of time.

Referring to FIG. 1, the encoding apparatus 100 may include a motion prediction unit 111, motion compensation unit 112, an intra-prediction unit 120, a switch 115, a subtractor 125, a transformation unit 130, a quantization unit 140, an entropy encoding unit 150, a inverse quantization unit 160, an inverse transformation unit 170, an adder 175, a filter unit 180, and a reference picture buffer 190.

The encoding apparatus 100 may encode an input image in an intra mode or an inter mode or both. In addition, the encoding apparatus 100 may generate a bitstream by encoding the input image, and may output the generated bitstream. When the intra mode is used as a prediction mode, the switch 115 may be switched to intra. When the inter mode is used as a prediction mode, the switch 115 may be switched to inter. Herein, the intra mode may be referred to as an intra-prediction mode, and the inter mode may be referred to as an inter-prediction mode. The encoding apparatus 100 may generate a prediction signal of an input block of the input image. The prediction signal, which is a block unit, may be referred to as a prediction block. In addition, after generating the prediction block, the encoding apparatus 100 may encode a residual value between the input block and the prediction block. The input image may be referred to as a current image that is a target of a current encoding. The input block may be referred to as a current block or as an encoding target block that is a target of the current encoding.

When the prediction mode is the intra mode, the intra-prediction unit 120 may use a pixel value of a previously encoded block adjacent to the current block as a reference pixel. The intra-prediction unit 120 may perform spatial prediction by using the reference pixel for spatial prediction, and may generate prediction samples of the input block by using the spatial prediction. Herein, intra prediction may mean intra-frame prediction.

When the prediction mode is the inter mode, the motion prediction unit 111 may search for a region that is optimally matched with the input block of a reference image in a motion predicting process, and may derive a motion vector by using the searched region. The reference image may be stored in the reference picture buffer 190.

The motion compensation unit 112 may generate the prediction block by performing motion compensation using the motion vector. Herein, the motion vector may be a two-dimensional vector that is used in inter prediction. In addition, the motion vector may indicate an offset between the current image and the reference image. Herein, inter prediction may refer to inter-frame prediction.

When a value of the motion vector is not an integer, the motion prediction unit 111 and the motion compensation unit 112 may generate the prediction block by applying an interpolation filter to a partial region in the reference image. In order to perform inter prediction or the motion compensation, based on the coding unit, a motion prediction method of the prediction unit included in the coding unit and a compensation method of the motion prediction may be determined among a skip mode, a merge mode, and an AMVP mode. In addition, the inter prediction or the motion compensation may be performed depending on the modes.

The subtractor 125 may generate a residual block by using the residual between the input block and the prediction block. The residual block may be referred to as a residual signal.

The transformation unit 130 may generate a transform coefficient by transforming the residual block, and may output the transform coefficient. Herein, the transform coefficient may be a coefficient value generated by transforming the residual block. In a transform skip mode, the transformation unit 130 may skip the transformation of the residual block.

A quantized transform coefficient level may be generated by applying quantization to the transform coefficient. Hereinafter, the quantized transform coefficient level may be referred to as the transform coefficient in the embodiments of the present invention.

The quantization unit 140 may generate the quantized transform coefficient level by quantizing the transform coefficient according to the quantization parameter, and may output the quantized transform coefficient level. Here, the quantization unit 140 may quantize the transform coefficient by using a quantization matrix.

The entropy encoding unit 150, according to the probability distribution, may generate the bitstream by performing entropy encoding on values calculated by the quantization unit 140 or on coding parameter values calculated in an encoding process, etc., and may output the bitstream. The entropy encoding unit 150 may entropy encode information for decoding an image, and information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may entropy encode by using a variable length coding/code (VLC) table. In addition, the entropy encoding unit 150 may derive a binarization method of the target symbol and a probability model of a target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional block form coefficient may be changed into the one-dimensional vector form by scanning the coefficient of the block with up-right scanning. According to the size of the transform unit and the intra prediction mode, vertical scanning that scans the two-dimensional block form coefficient in a column direction, and horizontal scanning that scans the two-dimensional block form coefficient in a row direction may be used rather than up-right scanning. In other words, the scanning method among up-right scanning, vertical direction scanning, and horizontal direction scanning may be determined according to the size of the transform unit and the intra-prediction mode.

The coding parameter may include not only information encoded by an encoder and then delivered to a decoder along with a syntax element, but also information that may be derived in an encoding or decoding process, or may refer to a parameter necessary for encoding and decoding. For example, the coding parameter may include at least one value or statistic of an intra prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, an unit size, unit partition information, etc.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal, which is a block unit.

When the encoding apparatus 100 performs encoding by using inter prediction, the encoded current image may be used as the reference image for another image(s) that will be processed thereafter. Therefore, the encoding apparatus 100 may decode the encoded current image, and may store the decoded image as the reference image. In order to perform the decoding, inverse quantization and inverse transformation may be performed on the encoded current image.

A quantized coefficient may be dequantized by the inverse quantization unit 160, and may be inversely transformed by the inverse transformation unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed image. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block based on pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original image by a pixel. In order to perform the offset correction on a specific picture, it is possible to use a method of applying an offset correction in consideration of edge information of each pixel or a method of partitioning pixels of an image into a predetermined number of regions, determining a region to be subjected to perform an offset correction, and applying the offset correction to the determined region.

The adaptive loop filter may filter based on a value obtained by comparing the reconstructed image and the original image. Pixels of an image may be partitioned into predetermined groups, a single filter being applied to each of the groups is determined, and different filtering may be performed at each of the groups. Information about whether or not the adaptive loop filter is applied may be transmitted to each coding unit (CU). A shape and a filter coefficient of an adaptive loop filter being applied to each block may vary. In addition, an adaptive loop filter having the same form (fixed form) may be applied regardless of characteristics of a target block.

The reconstructed block having passed the filter unit 180 may be stored in the reference picture buffer 190.

Figure 2:
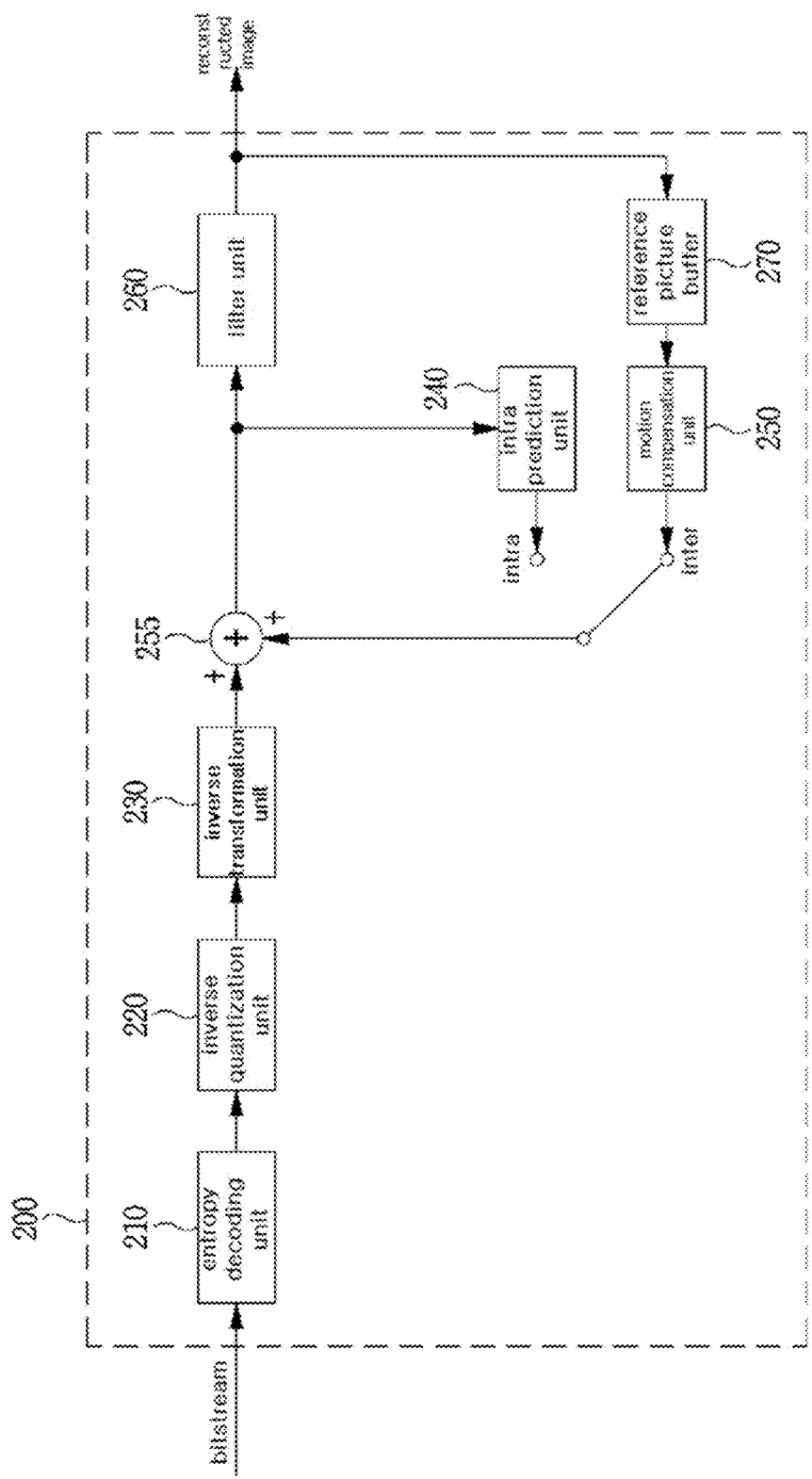
FIG. 2 is a block diagram showing a configuration of an image decoding apparatus to which an embodiment of the present invention is applied.

FIG. 2 is a block diagram showing a configuration of an image decoding apparatus to which an embodiment of the present invention is applied.

The decoding apparatus 200 may be a video decoding apparatus or an image decoding apparatus.

Referring to FIG. 2, the decoding apparatus 200 may include an entropy decoding unit 210, a inverse quantization unit 220, an inverse transformation unit 230, an intra prediction unit 240, motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed image by decoding, and may output the reconstructed image.

When the intra mode is used as a prediction mode used in decoding, the switch may be switched to intra. When the inter mode is used as the prediction mode used in decoding, the switch may be switched to inter.

The decoding apparatus 200 may obtain the reconstructed residual block from the inputted bitstream, and may generate the prediction block.

When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by entropy decoding the bitstream according to the probability distribution. The generated symbols may include a symbol having a form of a quantized transform coefficient level.

Herein, a method of entropy decoding may be similar to the above-described method of the entropy encoding. For example, the method of entropy decoding may be an inverse process of the above-described method of entropy encoding.

In order to decode the transform coefficient level, the entropy decoding unit 210 may change a one-dimensional block form coefficient into a two-dimensional vector form by using a transform coefficient scanning method. For example, the one-dimensional block form coefficient may be changed into the two-dimensional vector form by scanning the coefficient of the block with up-right scanning. According to the size of the transform unit and the intra prediction mode, vertical scanning and horizontal scanning may be used rather than up-right scanning. In other words, the scanning method among up-right scanning, vertical direction scanning, and horizontal direction scanning may be determined according to the size of the transform unit and the intra prediction mode.

The quantized transform coefficient level may be dequantized by the inverse quantization unit 220, and may be inversely transformed by the inverse transformation unit 230. The quantized transform coefficient level is dequantized and is inversely transformed so as to generate a reconstructed residual block. Here, the inverse quantization unit 220 may apply the quantization matrix to the quantized transform coefficient level.

When the intra mode is used, the intra-prediction unit 240 may generate a prediction block by performing the spatial prediction that uses the pixel value of the previously decoded block around the decoding target block.

When the inter mode is used, the motion compensation unit 250 may generate the prediction block by performing motion compensation that uses both the motion vector and the reference image stored in the reference picture buffer 270. When the value of the motion vector is not an integer, the motion compensation unit 250 may generate the prediction block by applying the interpolation filter to the partial region in the reference image. In order to perform motion compensation, based on the coding unit, a motion prediction method of the prediction unit included in the coding unit and a compensation method of the motion prediction may be determined among a skip mode, a merge mode, an AMVP mode, and a current picture reference mode. In addition, the inter prediction or the motion compensation may be performed depending on the modes. Herein, the current picture reference mode may mean a prediction mode using a previously reconstructed region within the current picture having the decoding target block. The previously reconstructed region may be not adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of refIdx=0 or the last position) within the reference picture list for the decoding target block. In addition, it is possible to be variably positioned within the reference picture list, and to this end, an additional reference picture index indicating a position of the current picture may be signaled.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed image. The filter unit 260 may output the reconstructed image. The reconstructed image may be stored in the reference picture buffer 270, and may be used in inter prediction.

Figure 3:
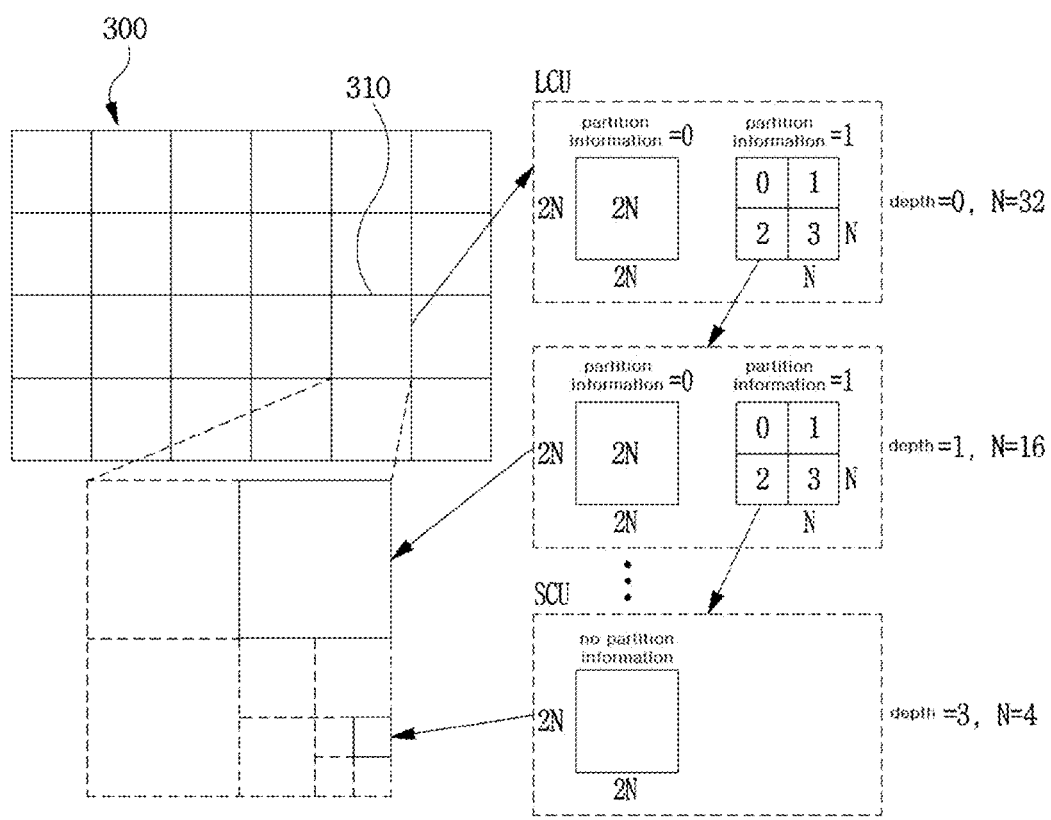
FIG. 3 is a diagram schematically showing a partition structure of an image when encoding the image.

FIG. 3 is a diagram schematically showing the partition structure of an image when encoding and decoding the image. FIG. 3 schematically shows an example of partitioning a single unit into a plurality of units of a lower layer.

In order to efficiently partition an image, a coding unit (CU) may be used while encoding and decoding. A unit may refer to 1) a syntax element, and 2) a block including sample images. For example, "a partition of a unit" may refer to "a partition of a block corresponding to the unit". Block partitioning information may include depth information of the unit. The depth information may indicate a number of partitions in the unit or/and a degree of partitioning.

Referring to FIG. 3, an image 300 is sequentially partitioned in the largest coding unit (hereinafter referred to as an LCU), and a partition structure is determined based on the LCUs. Herein, the LCU may be used as a coding tree unit (CTU). A single unit may include depth information based on a tree structure and may be hierarchically partitioned. Each of partitioned unit of a lower layer may include depth information. The depth information indicates a number of partitions in the unit or/and a degree of partitioning, and thus may include unit size information of the lower layer.

The partition structure may refer to a distribution of coding units (CUs) within the LCU 310. The CU may be a unit used for efficiently encoding an image. The distribution may be determined based on whether or not a single CU will be partitioned in plural (a positive integer more than 2 including 2, 4, 8, 16, etc.). A width size and a height size of each partitioned CU may be a half width size and a half height size of the single CU. Alternatively, the width size and the height size of each partitioned CU may be smaller than the width size and the height size of the single CU according to a number of partitioned units. Likewise, the partitioned CU may be recursively partitioned in a plurality of CUs each reduced by half in a width size and a height size from the partitioned CU.

Herein, the partition of a CU may be recursively performed up to a predetermined depth. Depth information may be information indicating a size of the CU. Depth information of each CU may be stored therein. For example, the depth of an LCU may be 0, and the depth of the smallest coding unit (SCU) may be a predetermined maximum depth. Herein, the LCU may be a CU having a maximum CU size as described above, and the SCU may be a CU having a minimum CU size.

Whenever the LCU 310 is partitioned and a width size and a height size thereof are reduced, the depth of a CU is increased by 1. A CU on which partitioning has not been performed may have a 2N×2N size for each depth, and a CU on which partitioning has been performed may be partitioned from a CU having a 2N×2N size to a plurality of CUs each having an N×N size. The size of N is reduced by half whenever the depth is increased by 1.

Referring to FIG. 3, the size of an LCU having a minimum depth of 0 may be 64×64 pixels, and the size of a SCU having a maximum depth of 3 may be 8×8 pixels. Herein, the LCU having 64×64 pixels may be represented by a depth of 0, a CU having 32×32 pixels may be represented by a depth of 1, a CU having 16×16 pixels may be represented by a depth of 2, and the SCU having 8×8 pixels may be represented by a depth of 3.

Further, information about whether or not a specific CU will be partitioned may be represented through partition information of 1 bit for each CU. All CUs, except for the SCU, may include the partition information. For example, when a CU is not partitioned, partition information may be 0. Alternatively, when a CU is partitioned, partition information may be 1.

Figure 4:
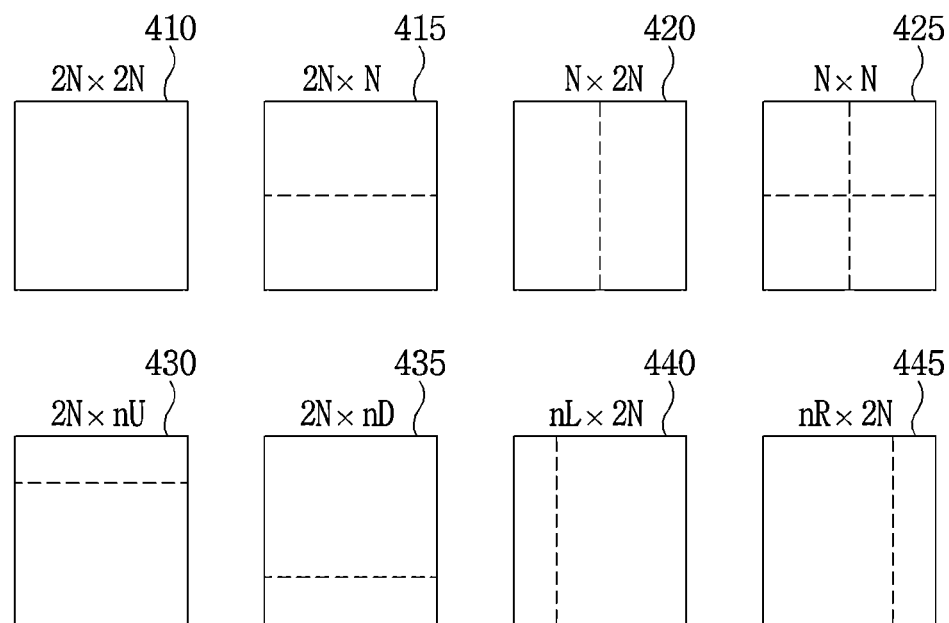
FIG. 4 is a diagram showing forms of a prediction unit (PU) that may be included in a coding unit (CU).

FIG. 4 is a diagram showing the forms of a prediction unit (PU) that may be included in a CU.

A CU that is no longer partitioned, from among CUs partitioned from the LCU, may be partitioned into at least one PU. Such a process may also refer to partitioning.

A prediction unit (PU) may be a basic unit of a prediction. The PU may be encoded and decoded in any one of a skip mode, inter-prediction mode, and intra-prediction mode. The PU may be partitioned in various forms depending on each mode.

As shown in FIG. 4, in the skip mode, there may not be a partition within the CU. In addition, a 2N×2N mode 410 having the same size as a CU may be supported without a partition within the CU.

In the inter-prediction mode, 8 partitioned forms, for example, the 2N×2N mode 410, a 2N×2N mode 415, an N×2N mode 420, an N×N mode 425, a 2N×nU mode 430, a 2N×nD mode 435, an nL×2N mode 440, and an nR×2N mode 445 may be supported within a CU.

Figure 5:
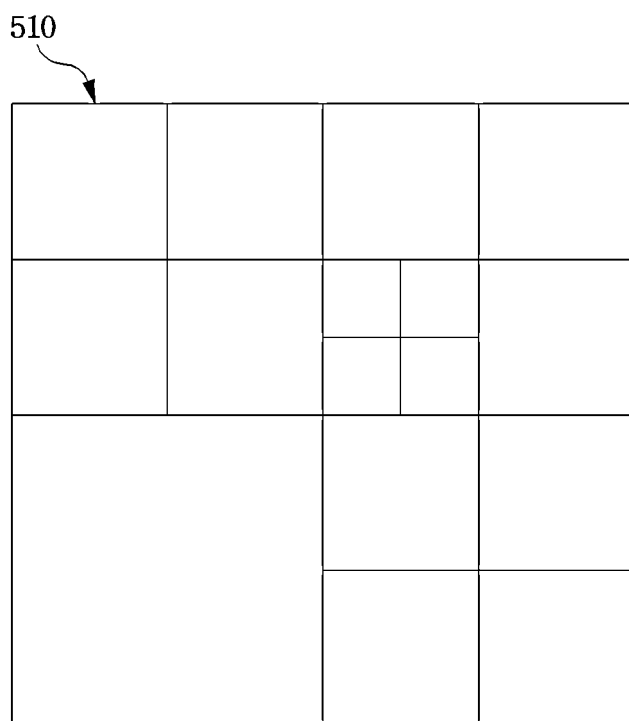
FIG. 5 is a diagram showing forms of a transform unit (TU) that may be included in a coding unit (CU).

FIG. 5 is a diagram showing forms of a transform unit (TU) that may be included in a CU.

A transform unit (TU) may be a basic unit used for a transformation, a quantization, a reverse transform, and a inverse quantization process within a CU. The TU may have a rectangular or square form. The TU may be dependently determined by a size and/or a form of a CU.

A CU that is no longer partitioned, from among CUs partitioned from the LCU, may be partitioned into one or more TUs. Herein, the partition structure of the TU may be a quad-tree structure. For example, as shown in FIG. 5, a single CU 510 may be partitioned once or more depending on a quad-tree structure, so that the CU 510 is formed of TUs having various sizes. Alternatively, the single CU 510 may be partitioned into at least one TU based in a number of horizontal lines and/or vertical lines that partition the CU.

The CU may be partitioned into TUs that are symmetrical to each other, or may be partitioned into TUs that are asymmetrical to each other. In order to partition into asymmetrical TUS, information of size and form of the TU may be signaled, or may be derived from information of size and form of the CU.

While performing a transform, a residual block may be transformed by using one of predetermined methods. For example, the predetermined methods may include a discrete cosine transform (DCT), a discrete sine transform (DST), or a Karhunen-Loève transform (KLT). In order to determine the method of transforming the residual block, the method may be determined by using at least one of inter-prediction mode information of prediction unit, intra-prediction mode information of prediction unit, or a size and form of the transform block. Alternatively, information indicating the method may be signaled in some cases.

Figure 6:
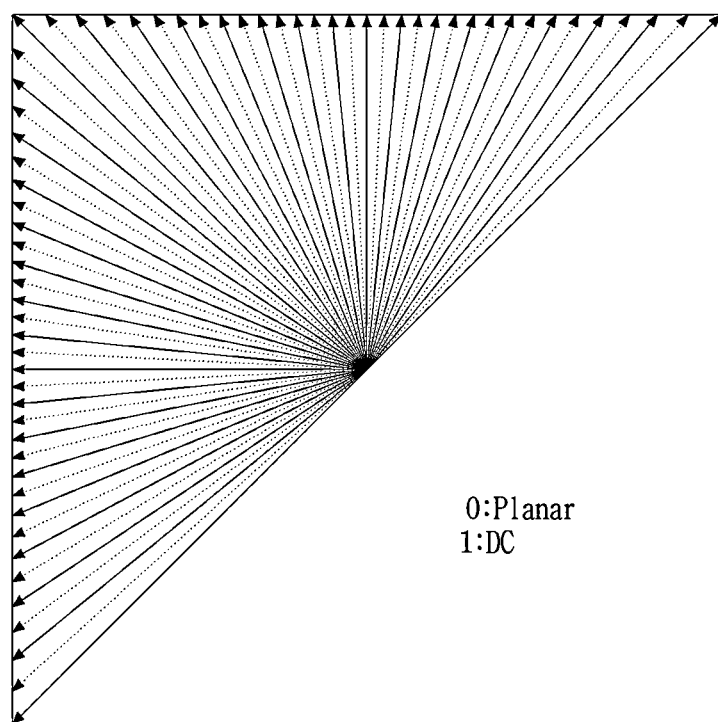
FIG. 6 is a diagram showing an example of an intra-prediction process.

FIG. 6 is a diagram showing an example of showing an intra-prediction mode.

A number of intra-prediction modes may vary according to a size of a prediction unit (PU), or may be fixed to N numbers regardless of the size of the prediction unit (PU). Herein, the N numbers may include 35, and 67, or may be a positive integer more than 1. For example, a predetermined intra-prediction mode of an encoder/decoder may include two non-directional modes and 65 directional modes, as shown in FIG. 6. The two non-directional modes may include a DC mode and a planar mode.

The number of intra-prediction modes may differ according to a type of color component. For example, the number of intra-prediction modes may be varied whether the color component is a luma signal or a chroma signal.

The PU may have a square form having an N×N or a 2N×2N size. The N×N size may include 4×4, 8×8, 16×16, 32×32, 64×64, 128×128, etc. Alternatively, the PU may have an M×N size. Herein, M and N may be a positive integer more than 2, and M and N may be different numbers. A unit of PU may be a size of at least one of CU, PU, and TU.

Intra encoding and/or decoding may be performed by using a sample value included in a neighboring reconstructed unit or a coding parameter.

In intra prediction, a prediction block may be generated by applying a reference sample filter to a reference pixel through using at least one of size of encoding/decoding target blocks. Types of the reference filter applied to the reference pixel may differ. For example, the reference filter may differ according to the intra-prediction mode of an encoding/decoding target block, a size/form of an encoding/decoding target block, or a position of the reference pixel. "Types of the reference filter may differ" may refer to a filter coefficient of the reference filter, a number of filter taps, filter intensity, or a number of filtering process may be differed.

In order to perform intra prediction, an intra-prediction mode of a current prediction unit may be predicted by an intra-prediction mode of a neighboring prediction unit that is adjacent to the current prediction unit. When the intra-prediction mode of the current prediction unit is predicted by using intra-prediction mode information of the neighboring prediction unit, and the both of the modes are identical, information that the both of modes are identical may be transmitted by using a predetermined flag. Alternatively, when the modes are different, all prediction mode information within encoding/decoding target block may be encoded by entropy encoding.

Figure 7:
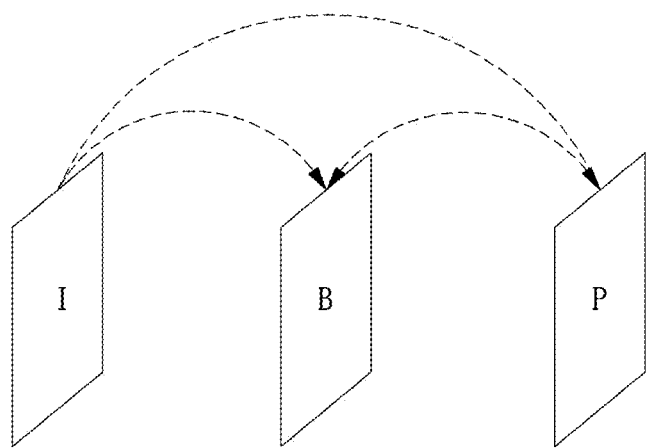
FIG. 7 is a diagram showing an example of an inter-prediction process.

FIG. 7 is a diagram showing an example of an inter-prediction process.

A rectangle of FIG. 7 may refer to an image (or picture). In addition, arrows of FIG. 7 may indicate a prediction direction. In other words, the image may be encoded and/or decoded according to the arrow directions. Each image may be classified into an I-picture (Intra picture), a P-picture (Uni-predictive Picture), and a B-picture (Bi-predictive Picture), etc according to an encoding type. Each picture may be encoded and decoded according to an encoding type of each picture.

When an encoding target image is an I-picture, the target image itself may be intra encoded while performing inter prediction. When an encoding target image is a P-picture, the target image may be encoded by inter prediction using a reference image in a forward direction, or motion compensation. When an encoding target image is a B-picture, the target image may be encoded by inter prediction using reference pictures in a forward direction and in a reverse direction, or motion compensation. Alternatively, the target image may be encoded by inter prediction using a reference image in forward direction or in a reverse direction. Herein, in case of the inter-prediction mode, the encoder may perform inter prediction or the motion compensation, and the decoder may perform motion compensation in response to the encoder. Images of a P-picture and a B-picture that are encoded and/or decoded by using a reference image are used for inter prediction.

Hereinbelow, inter prediction according to an embodiment is described in detail.

Inter prediction or motion compensation may be performed by using a reference image and motion information. In addition, inter prediction may use the skip mode described above.

The reference picture may be at least one of a previous picture of a current picture or a subsequent picture of the current picture. Herein, in inter prediction, a block of the current picture based on the reference picture may be predicted. Herein, an area within the reference picture may be specified by using a reference picture index refIdx indicating the reference picture and a motion vector that will be described later.

In inter prediction, a reference block that corresponds to the current block within the reference picture may be selected. A prediction block of the current block may be generated by using the selected reference block. The current block may be a current encoding or decoding target block among blocks of the current picture.

Motion information may be derived from inter-prediction process of the encoding apparatus 100 and the decoding apparatus 200. In addition, the derived motion information may be used for inter prediction. Herein, the encoding apparatus 100 and the decoding apparatus 200 may improve efficiency of encoding and/or decoding by using motion information of a reconstructed neighboring block and/or motion information of a collocated block (col block). The collocated block may be a block that spatially corresponds to an encoding/decoding target block within a reconstructed collocated picture (col picture). The reconstructed neighboring block may be a block within the current picture and a reconstructed block through encoding and/or decoding. In addition, the reconstructed block may be a block adjacent to the encoding/decoding target block and/or a block positioned at an outer corner of the encoding/decoding target block. Herein, the block positioned at the outer corner of the encoding/decoding target block may be a block that is adjacent in a vertical direction, and the block adjacent in a vertical direction is adjacent to the encoding/decoding target block in a horizontal direction. Alternatively, the block positioned at the outer corner of the encoding/decoding target block may be a block that is adjacent in horizontal direction, and the block adjacent in horizontal direction is adjacent to the encoding/decoding target block in a vertical direction.

Each of the encoding apparatus 100 and the decoding apparatus 200 may determine a predetermined relative position based on a block that is present at a position spatially corresponding to the current block within the collocated picture. The predetermined relative position may be positioned at inside and/or outside of the block that is present at the position spatially corresponding to the current block. In addition, the encoding apparatus 100 and the decoding apparatus 200 may derive the collocated block based on the determined relative position. Herein, the collocated picture may be at least one picture among reference pictures included in a reference picture list.

A method of deriving the motion information may vary according to a prediction mode of the encoding/decoding target block. For example, the prediction mode applied for inter prediction may include an advanced motion vector predictor (AMVP) mode, a merge mode, and the like. Herein, the merge mode may refer to a motion merge mode.

For example, in the case of applying the advanced motion vector predictor (AMVP) mode, the encoding apparatus 100 and the decoding apparatus 200 may generate a prediction motion vector candidate list by using a motion vector of the restored neighboring block and/or a motion vector of the collocated block. In other words, the motion vector of the restored neighboring block and/or the motion vector of the collocated block may be used as a prediction motion vector candidate. Herein, the motion vector of the collocated block may refer to a temporal motion vector candidate, and the motion vector of the restored neighboring block may refer to a spatial motion vector candidate.

The encoding apparatus 100 may generate a bitstream, and the bitstream may include a motion vector candidate index. In other words, the encoding apparatus 100 may entropy encode the motion vector candidate index to generate the bit stream. The motion vector candidate index may indicate an optimal prediction motion vector selected among the prediction motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index through the bit stream, and select the motion vector candidate of the decoding target block among the motion vector candidates included in the motion vector candidate list, by using the entropy decoded motion vector candidate index.

The encoding apparatus 100 may calculate a motion vector difference (MVD) between the motion vector of the encoding target block and the motion vector candidate, and may entropy encode the motion vector difference (MVD). The bitstream may include the entropy encoded MVD. The MVD is transmitted to the decoding apparatus 200 through the bitstream. Herein, the decoding apparatus 200 may entropy decode the MVD from the bitstream. The decoding apparatus 200 may derive the motion vector of the decoding target block through a sum of the decoded MVD and the motion vector candidate.

The bitstream may include a reference picture index indicating the reference picture. The reference picture index may be entropy encoded and transmitted from the encoding apparatus 100 to the decoding apparatus 200 through the bitstream. The decoding apparatus 200 may predict the motion vector of the current block by using the motion information of the neighboring block, and may derive the motion vector of the decoding target block by using the predicted motion vector and a residual of the predicted motion vector. The decoding apparatus 200 may generate the prediction block of the decoding target block based on the derived motion vector and the reference picture index information.

As another method of deriving the motion information, a merge mode may be used. The merge mode may refer to a motion merging of a plurality of blocks. The merge mode may refer to applying motion information of a single block to another block. When the merge mode is applied, the encoding apparatus 100 and the decoding apparatus 200 may generate a merge candidate list by using the motion information of the restored neighboring block and/or the motion information of the collocated block. Herein, the motion information may include at least one of 1) the motion vector, the reference picture index, and 3) an inter-prediction indicator. The prediction indicator may indicate a uni-direction (L0 prediction, L1 prediction), or a bi-direction.

Herein, the merge mode may be applied in a unit of a coding unit or a prediction unit (PU). In the case of performing the merge mode by the CU unit or the PU unit, the encoding apparatus 100 may generate a bitstream by entropy encoding predetermined information, and transmit the bitstream to the decoding apparatus 200. The bitstream may include the predetermined information. The predetermined information may include 1) a merge flag representing whether the merge mode is used for each block partition, 2) a merge index including information to which block among the neighboring blocks adjacent to encoding target block is merged. For example, neighboring blocks adjacent to encoding target block may include a left adjacent block of the current block, an upper adjacent block of the encoding target block, a temporally adjacent block of the encoding target block, and the like.

The merge candidate list may represent a list in which the motion information is stored. The merge candidate list may be generated before performing the merge mode. The motion information stored in the merge candidate list may be at least one of motion information of the neighboring block adjacent to the encoding/decoding target block, or motion information of the collocated block corresponding to the encoding/decoding target block in the reference picture, motion information newly generated by combining the motion information that is present in the merge motion candidate list in advance, and a zero merge candidate. Herein, the motion information of the neighboring block adjacent to the encoding/decoding target block may refer to a spatial merge candidate, and the motion information of the collocated block corresponding to the encoding/decoding target block in the reference picture may refer to a temporal merge candidate.

In the case of a skip mode, the skip mode applies the motion information of the neighboring block to the encoding/decoding target block. The skip mode may be one of other modes used in inter prediction. When the skip mode is used, the encoding apparatus 100 may generate a bitstream by entropy encoding information of the neighboring block that may be used for the encoding target block, and transmit the bit stream to the decoding apparatus 200. The encoding apparatus 100 may not transmit other information such as syntax information to the decoding apparatus 200. The syntax information may include at least one of residual information of the motion vector, an encoding block flag, and a transform coefficient level.

FIGS. 8 to 18 are diagrams showing a method of generating a geometric modified image by geometrically modifying an image.

A geometric modification of an image may refer to geometrically modifying light information of the image. The light information may refer to luminance, color, or chrominance of each point of the image. Alternatively, the light information may refer to a pixel value in a digital image. The geometric modification may refer to a parallel movement of each point within an image, a rotation of an image, a size change of an image, etc.

FIGS. 8 to 12 are diagrams respectively showing a geometric modification of an image according to the present invention. (x, y) of each figure refers to a point of an original image before the modification. (x', y') refers to a point that corresponds to the point (x, y) after the modification. Herein, the corresponding point refers to a point in which light information of the (x, y) is moved by the geometric modification.

Figure 8:
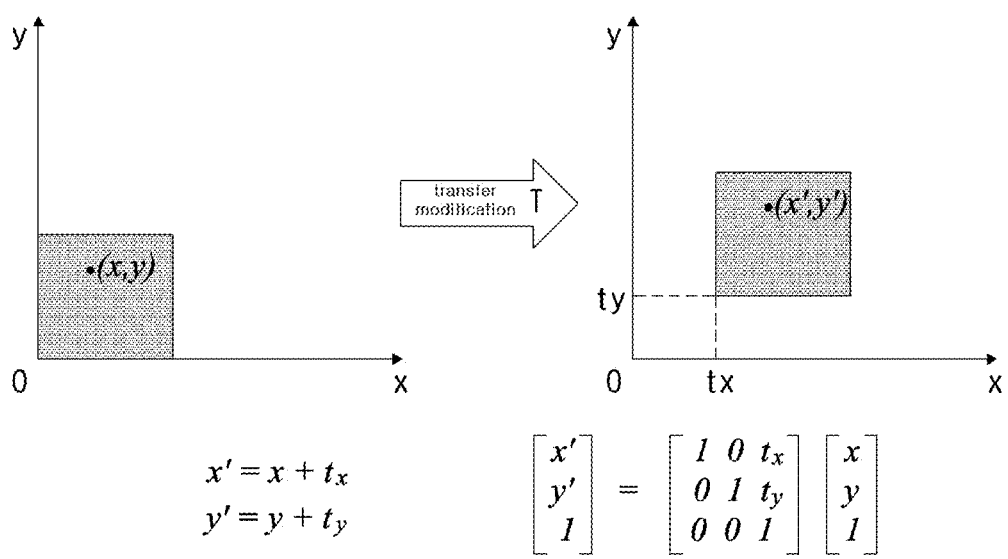
FIG. 8 is a diagram showing a transfer modification of an embodiment of a geometrical modification of an image according to the present invention.

FIG. 8 is a diagram showing a transfer modification of an embodiment of the geometric modification of the image according to the present invention.

In FIG. 8, tx refers to a displacement of each point that has transferred in an x-axis, and ty refers to a displacement of each point that has transferred in a y-axis. Therefore, a point (x', y') within the image is derived by adding tx and ty to a point (x, y) that is a point within the image before the modification. The transfer modification may be represented in a matrix shown in FIG. 8.

Figure 9:
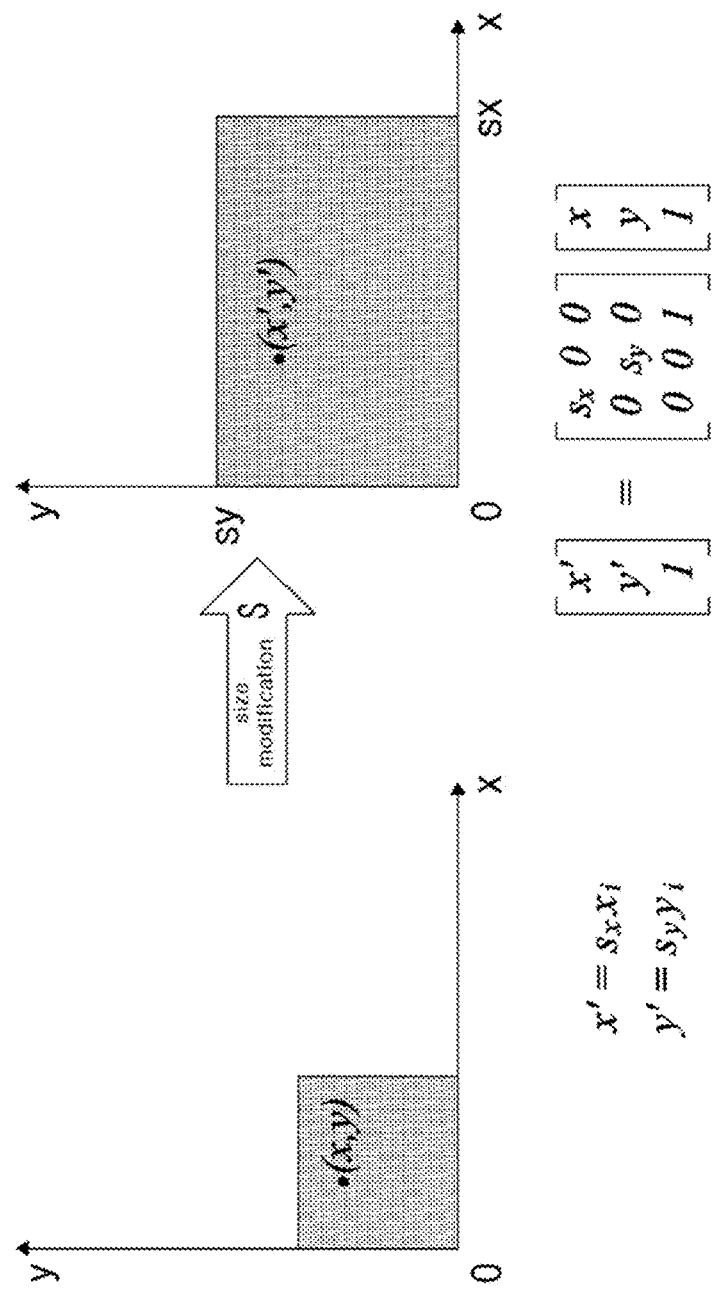
FIG. 9 is a diagram showing a size modification of an embodiment of a geometrical modification of an image according to the present invention.

FIG. 9 is a diagram showing a size modification of an embodiment of a geometrical modification of an image according to the present invention.

In FIG. 9, sx refers to a size modification multiple in a direction of an x-axis and sy refers to a size modification multiple in a direction of a y-axis. The size modification multiple may refer to a size ratio of an image before the modification to an image after the modification. When sdize modification multiple is equal to 1, it means that a size of the image before the modification is equal to a size of the image after the modification. When size modification multiple is larger than 1, it means that a size of the image is enlarged after the modification. When size modification multiple is smaller than 1, it means that a size of the image is reduced after the modification. The size modification multiple always has a value greater than 0. Therefore, a point (x', y') within the size-modified image after the modification is derived by multiplying sx and sy to a point (x, y) within the image before the modification. The size modification may be represented in a matrix shown in FIG. 9.

Figure 10:
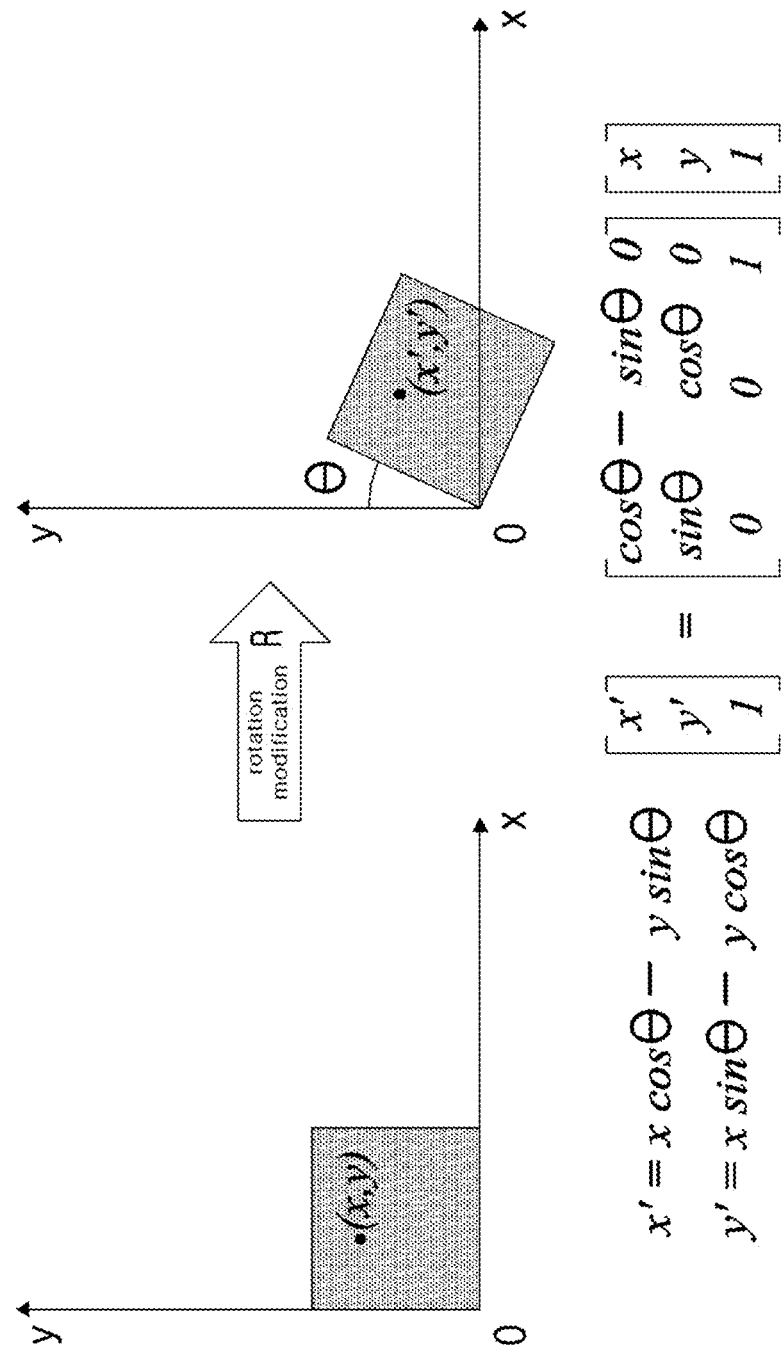
FIG. 10 is a diagram showing a rotation modification of an embodiment of a geometrical modification of an image according to the present invention

FIG. 10 is a diagram showing a rotation modification of an embodiment of a geometrical modification of an image according to the present invention In FIG. 10, θ refers to a rotation angle of an image. In the embodiment of FIG. 10, a rotation is performed centering around a point (0, 0) of an image before the modification. A point (x', y') within the rotation-modified image after the modification may be derived by using θ and a trigonometrical function. The rotation modification may be represented in a matrix shown in FIG. 10.

Figure 11:
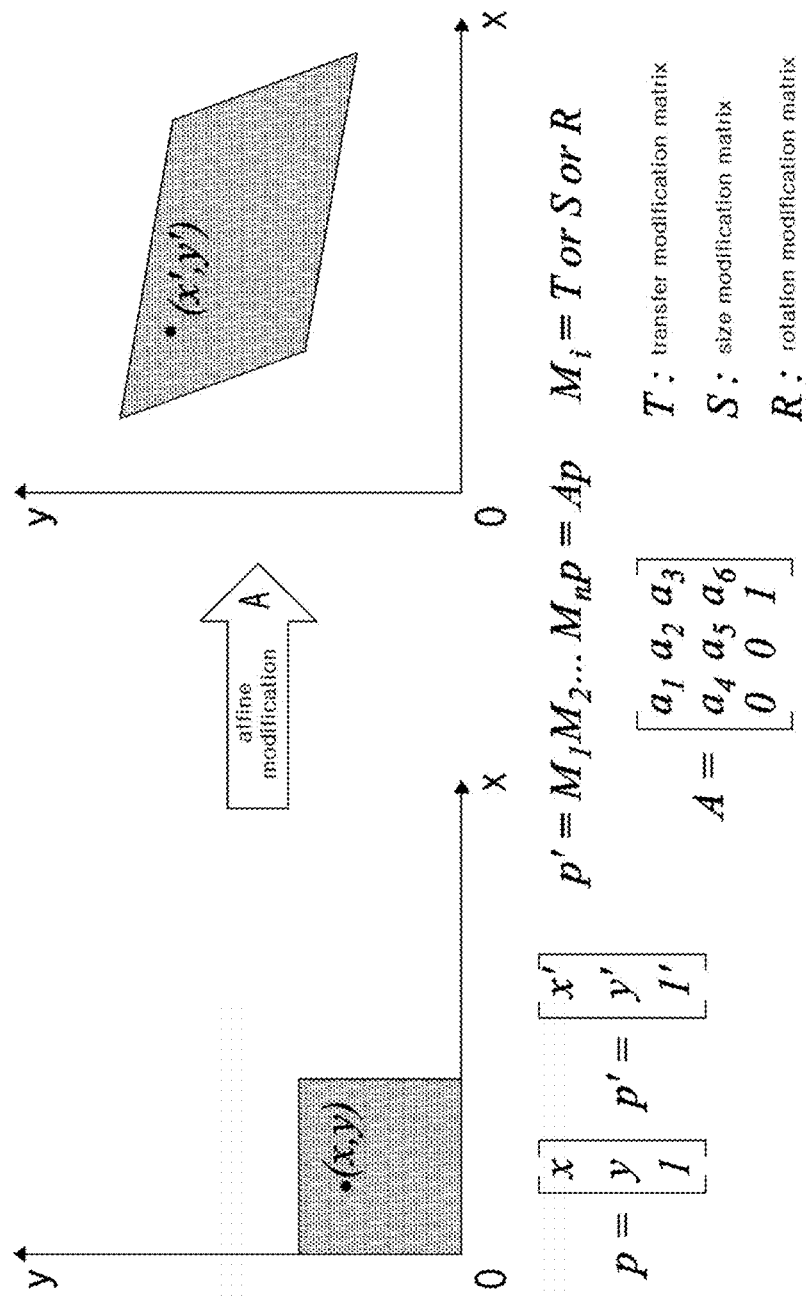
FIG. 11 is a diagram showing an affine modification of an embodiment of a geometrical modification of an image according to the present invention.

FIG. 11 is a diagram showing an affine modification of an embodiment of a geometrical modification of an image according to the present invention.

The affine modification refers to the case where a transfer modification, a size modification, and a rotation modification are complexly performed. A geometric modification of the affine modification may be varied according to orders of the transfer modification, the size modification, and/or the rotation modification that are applied to the image. The image may be modified in the form of tilting as well as the transfer modification, the size modification and the rotation modification according to the order of applying among a plurality of the modifications composing the affine modification and complex of each of the modifications.

In FIG. 11, Mi may be a 3×3 matrix for a transfer modification, a size modification, or a rotation modification. According to an order of modifications composing the affine modification, a 3×3 matrix may be obtained by matrix product each of matrixes for the modifications by each other. In FIG. 11, matrix A may correspond to a 3×3 matrix obtained by matrix product a matrix M1 to matrix Mn. The matrix A may consist of elements a1 to a6. A matrix p is a point within an image before the modification that is represented in a matrix. A matrix p' is a point within an image after the modification and corresponds to the point p within the image before the modification. Therefore, the affine modification may be represented as a matrix equation p'=Ap.

Figure 12:
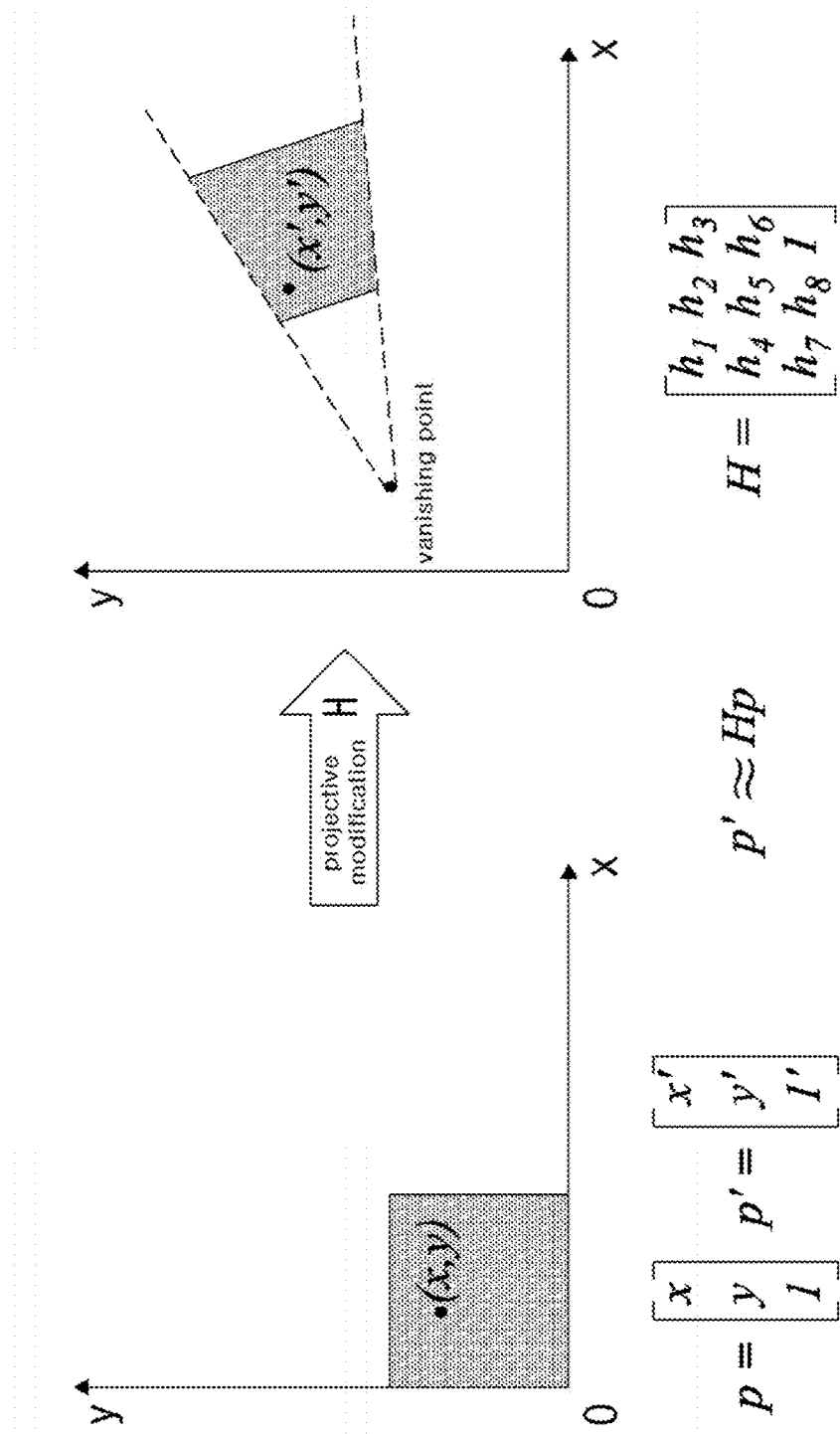
FIG. 12 is a diagram showing a projective modification of an embodiment of a geometrical modification of an image according to the present invention.

FIG. 12 is a diagram showing a projective modification of an embodiment of a geometrical modification of an image according to the present invention.

The projective modification may be an extended affine modification in which a perspective modification is added to the affine modification. When an object in a three-dimensional space is projected into a two-dimensional plane, a perspective modification may occur according to viewing viewing angle of a camera or an observer. In the perspective modification, objects far away are represented to be small and objects near are represented to be large.

In FIG. 12, a matrix H may be used for the projective modification. Elements h1 to h6 constituting the matrix H may correspond to the elements a1 to a6 constituting the matrix A for the affine modification of FIG. 11. Thereby, the projective modification may include the affine modification. Elements h7 and h8 constituting the matrix H may be elements related to the perspective modification.

A geometric modification of an image is a method for geometrically modifying the image to a specific form. A point within an image after a geometric modification that corresponds to a point within the image before the geometric modification may be calculated by a geometric modification defined in a matrix. On the contrary, a homography refers to a method of reversely deriving a mutual geometric modification matrix from two images respectively having points corresponding to each other.

Figure 13:
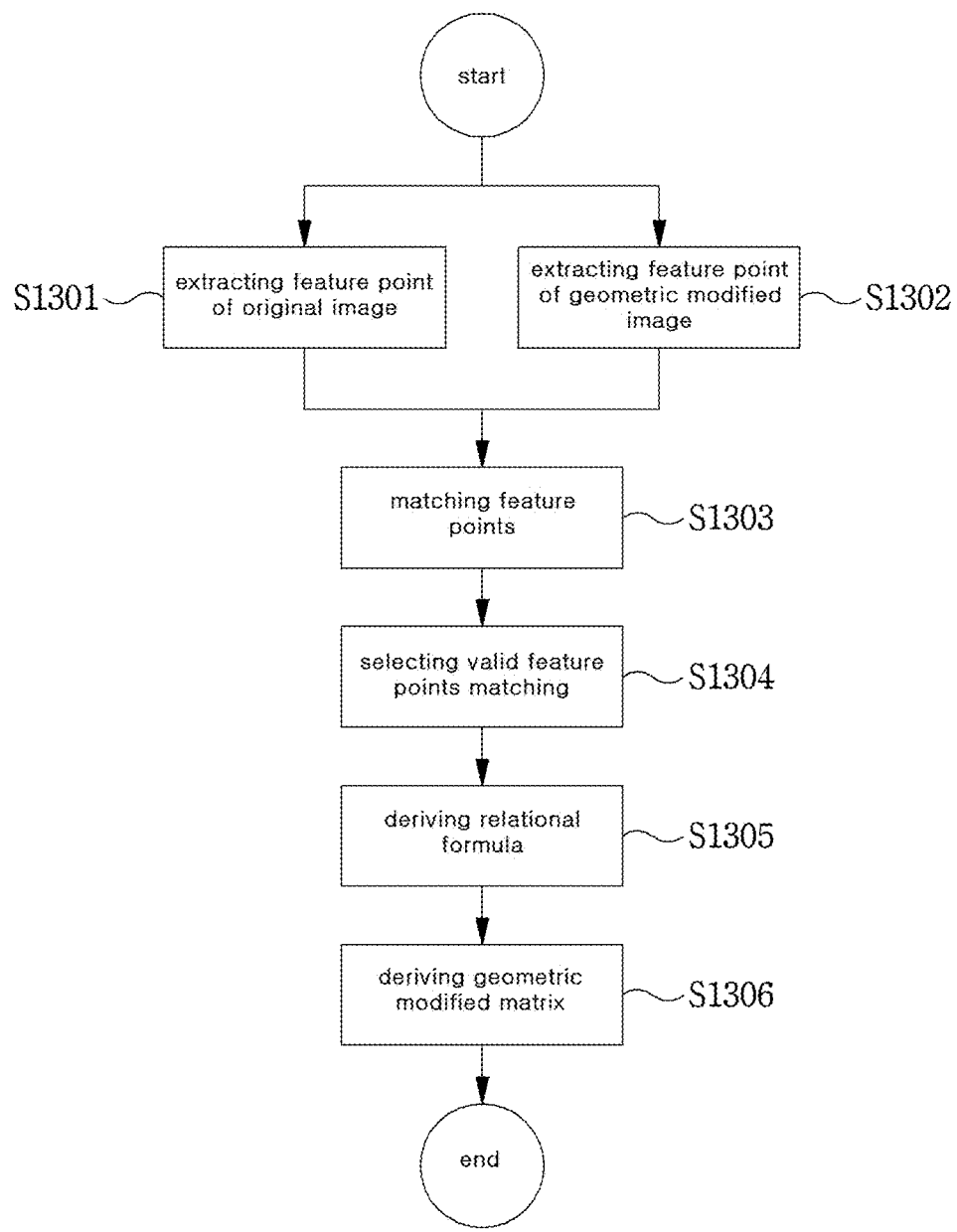
FIG. 13 is a diagram showing an example method of implementing a homography according to the present invention.

FIG. 13 is a diagram showing an example method of implementing a homography according to the present invention.

The homography may derive a geometric modification relation between two images based on an identification of two points within two images and correspond with each other. For this, a feature point matching may be used. A feature point of an image refers to a point that has a descriptive feature within the image.

In steps S1301 and S1302, the homography implementing method may extract feature points from an original image and a geometric modified image. A feature point of an image may be differently extracted according to an extracting method, or according to a usage purpose. A point within an image in which a luminance value thereof is dramatically changed, a center point of an area which has a specific shape, or a corner point of an object within the image may be used as the feature point. The feature point may be extracted by using algorithms such as scale-invariant feature transform (SIFT), speeded up robust feature (SURF), Blob Detection, etc.

In step S1303, the homography implementing method may match the feature point based on the feature points extracted from the original image and the geometric modified image. In detail, each of the extracted feature points are descriptive, the feature point between the two images may be matched by finding points having similar description information. The matched feature points may be used as a point in which the original image and the geometric modified image correspond with each other.

However, the feature point matching may not match points that actually correspond with each other. Therefore, in step S1304, a valid feature point among the derived feature points may be selected. The method of selecting the valid feature point may be varied according to a calculation algorithm. For example, methods such as a method of excluding a feature point that does not satisfy a baseline based on the description information, a method of excluding a feature point in which a similarity is very low through a distribution of matched results, or a method of using a random sample consensus (RANSAC) algorithm may be used. The homography implementing method may selectively perform the step S1304 according to a matching result of the feature points. In other words, the step S1304 may not be performed according to circumstances. Alternatively, the steps S1303 and S1304 may be merged. Alternatively, the homography implementing method may perform a matching process of a valid feature point instead of performing steps S1303 and S1304.

In step S1305, the homography implementing method may derive a relation formula between the original image and the geometric modified image by using the selected valid points. In step S1306, the homography implementing method may derive a geometric matrix by using the derived formula. Alternatively, the homography implementing method may not perform the step S1306, and output information of the derived formula obtained the step S1305 in a different form except for a geometric modification matrix.

FIG. 14 is an example method of deriving a relational formula between two points corresponding within two images according to the present invention.

A geometric modification of an image may be performed by a 3×3 matrix H. Therefore, simultaneous equations including elements h1 to h9 of the matrix H as unknown quantity may be derived from a matrix formula p'=Hp. Herein, p means a point within an original image, and p' means a point within a geometric modified image that corresponds to the point p. The equation may be simply calculated by fixing the h9 to 1 by dividing all elements of the matrix H into h9. Also, the number of unknown quantity may be reduced to 8 from 9.

Elements k1 to k8 of FIG. 14 correspond to values in which h1 to h8 is divided by h9. A geometric matrix in which h9 is changed in 1, and h1 to h8 are changed in k1 to k8, respectively, may perform an identical geometric modification. Therefore, 8 unknown values may be needed to be calculated. In FIG. 14, the final formula for one pair of points matching with each other in a single point may be expressed in two forms for x' and y'. At least 4 pairs of points matching with each other may be needed since there are 8 unknown values. However, the pair points may mismatch with each other as described above. Alternatively, the pair points may match with an error. Such an error may occur even when valid feature points are selected. Such an error may be reduced by using many pair points matching with each other while calculating the geometric modified matrix. Therefore, a number of the pair points that will be used may be determined considering such features.

FIG. 15 is a diagram showing a method of generating a geometrically modified image based on a geometric modification matrix and an original image according to the present invention.

As shown in FIG. 15, generation of a geometric modified image may correspond to a generation of light information of a corresponding point within the geometric modified image by using light information of a point within an original image. (x0, y0), (x1, y1), and (x2, y2) of FIG. 15 refer to different points within the original image. In addition, (x'0, y'0), (x'1, y'1), and (x'2, y'2) are points within the geometric modified image that respectively correspond to (x0, y0), (x1, y1), and (x2, y2). A function f calculates a corresponding x' coordinate of an x-axis within the geometric modified image by using the point (x, y) within the original image and additional information a that is used for the geometric modification. A function g calculates a corresponding y' coordinate of a y-axis within the geometric modified image by using the point (x, y) within the original image and additional information β that is used for the geometric modification. When (x, y), (x', y'), function f, and function g are expressed in a matrix formula, a matrix H may refer to a geometric modification method. Therefore, points that mutually correspond to each other within the original image and the geometric modified image may be found by using the matrix H.

The geometric modification method of FIG. 15 may be problematic in a discrete sample image signal, since light information is only included in points having an integer number coordinate of the discrete image signal. Therefore, when a point within the geometric modified image and corresponding to a point within the original image has a real number coordinate, light information of the closest integer number coordinate is assigned to the point within the geometric modified image. Thus, light information may be overlapped to a part of points having a real number coordinate within the geometric modified image or the light information may not be assigned. In this case, inverse mapping may be used.

Figure 16:
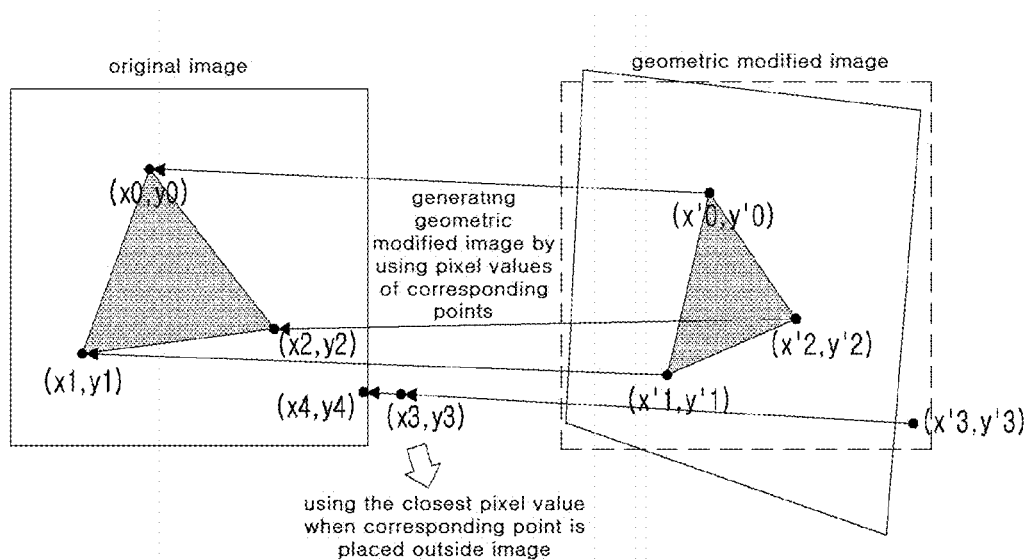
FIG. 16 is a diagram showing a method of generating a geometrically modified image by using inverse mapping according to the present invention.

FIG. 16 is a diagram showing a method of generating a geometrically modified image by using inverse mapping according to the present invention.

A dotted rectangular area of FIG. 16 refers to an area that is actually observed. Points within an original image corresponding to each point within the dotted rectangular area may be derived. Therefore, light information of the original image may be assigned to all points within the geometric modified image. However, a point (x3, y3) corresponding to (x'3, y'3) may placed outside of the original image. In this case, light information of the original image may not be assigned to the point (x'3, y'3). In points where light information of the original image is not assigned, neighboring light information of the original image may be assigned. In other words, light information of the closest point within the original image, for example, (x4, y4), may be assigned.

Figure 17:
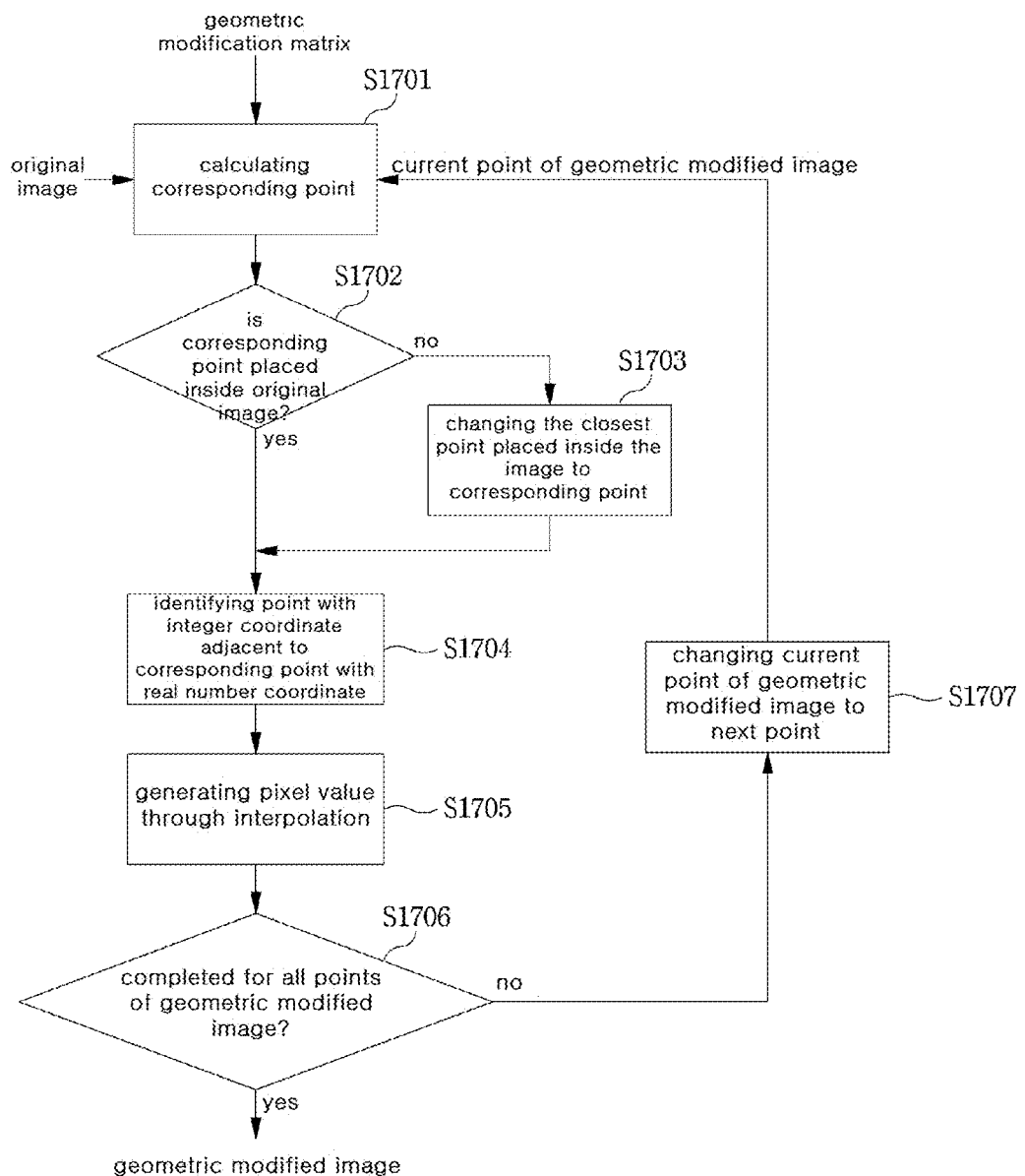
FIG. 17 is a diagram showing a method of generating a geometrically modified image based on a geometric modification matrix and an original image according to the present invention wherein the geometric modification matrix may correspond to geometric modification information.

FIG. 17 is a diagram showing a method of generating a geometric modified image based on a geometric modification matrix and an original image according to the present invention wherein the geometric modification matrix may correspond to geometric modification information.

In step S1701, the generation method may receive input an original image, a geometric modification matrix and/or information on the current point of a geometric modified image. The generation method may calculate a point of the original image corresponding to the current point of the geometric modified image by using the original image and the geometric modified matrix. The calculated corresponding point of the original image may be a real number corresponding point having a real number coordinate.

In step S1702, the generation method may determine whether or not the calculated corresponding point is placed inside the original image.

In step S1702, when the calculated corresponding point is not placed inside the original image, in step S1703, the generation method may change the point closest to the calculated corresponding point within the original image with the corresponding point.

In step S1702, when the calculated corresponding point is placed inside the original image, the generation method may perform step S1704. The generation method may perform the step S1704 when the calculated corresponding point is changed in step 1703.

In step S1704, when the corresponding point has a real number coordinate, the generation method may identify a closest point having an integer number coordinate. When the corresponding point has an integer number coordinate, the generation method may skip steps S1704 and S1705, and perform step S1706.

In step S1705, the generation method may generate light information of the point having a real number coordinate by interpolating light information of the identified point having an integer number coordinate (for example, a pixel value). As methods of interpolating, Lanczos interpolation, S-Spline interpolation, Bicubic interpolation may be used.

In step S1706, the generation method may check all points within the geometric modified image whether or not the geometric modifications thereof are completed. Then, the generation method may finally output the generated geometric modified image.

When it is determined that the geometric modifications are not completed in step S170, in step S1707, the generation method may change a current point of the geometric modified image to another point, and may repeat steps S1701 to S1706.

Figure 18:
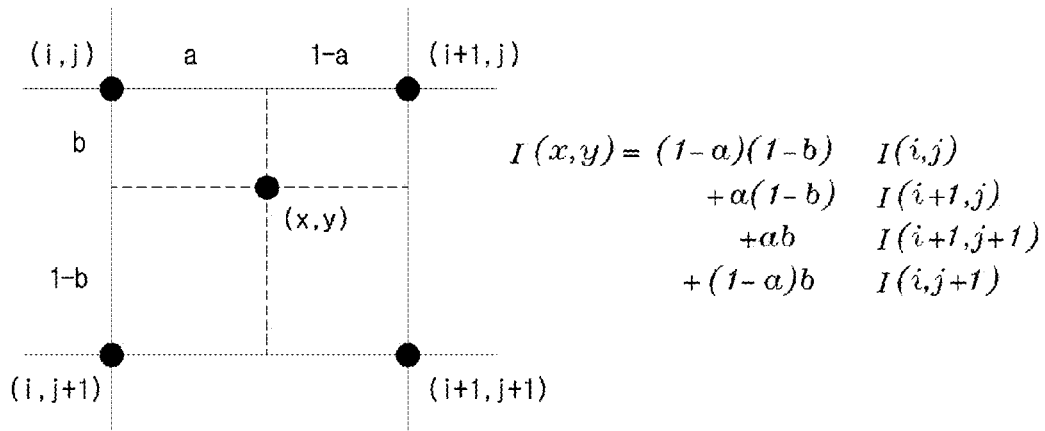
FIG. 18 is a diagram showing bilinear interpolation among various interpolation methods shown with reference to FIG. 17 according to an embodiment the present invention.

FIG. 18 is a diagram showing a bilinear interpolation among various interpolation methods explained with reference to FIG. 17 according to an embodiment the present invention.

In FIG. 18, a real number coordinate (x, y) may correspond to the real number corresponding point mentioned in step S1704 of FIG. 17. 4 points (i,j), (i,j+1), (i+1,j), and (i+1,j+1) that are adjacent to the coordinate (x, y) may correspond to the closest point having an integer number coordinate that is mentioned in step S1704 of FIG. 17. I(x,y) may refer to light information of the point (x,y) such as luminance. a refers to an x-axis distance between i and x, and b refers to a y-axis distance between j and y. 1−a refers to an x-axis distance between i+1 and x, and 1−b refers to a y-axis distance between j+1 and y. Light information of the point (x, y) may be calculated from light information of points (i, j), (i, j+1), (i+1, j), and (i+1, j+1) by using a ratio of a to 1−a in the x-axis, and a ratio of b to 1−b in the y-axis.

When an inter-prediction unit of a video encoder performs motion prediction, the inter-prediction unit may predict an encoding target area (a current area or a current block) within an encoding target picture (a current picture) by referencing a reference picture. Herein, when a time interval between the reference picture and the encoding target picture is great, or a rotation, a zoom-in, a zoom-out, or a global motion such as perspective change of an object has occurred between two images, pixel similarity between two images is lowered. Therefore, prediction accuracy may be lowered and encoding efficiency may be degraded. In this case, the encoder may calculate motion changes between the encoding target picture and the reference picture, and geometrically modify the reference picture such that the reference picture has a similar form with the encoding target picture. The reference picture may be geometrically modified in a unit of a frame, a slice, and/or a block. A picture that is generated by geometrically modifying the reference picture may be defined as a geometric modified picture. The motion prediction accuracy is improved by referencing the geometric modified picture rather than the reference picture.

According to the present invention, the reference picture and/or the geometric modified picture is not limited to a frame size or a picture size configuring one frame of a video. In the present invention, a part area of a reference picture having a picture (frame) size defined in a parameter set may refer to a reference picture. A geometric modified picture generated by modifying a reference picture or a part area of the reference picture may have a size corresponding to an image size before being modified. In other words, when the image before being modified is a reference picture that has a picture (frame) size, then a geometric modified picture thereof may have the picture (frame) size. When the image before being modified is a part area of the reference picture having the picture (frame) size, the geometric modified picture may have a size corresponding to the part area of the reference picture.

A video decoder may receive information necessary for a geometrical modification when the video encoder has performed encoding by referencing the geometric modified picture. The information necessary for the geometrical modification may refer to geometric modification information. The video decoder may generate the geometric modified picture from the reference picture based on the received geometric modification information. The video decoder may perform inter prediction by referencing the generated geometric modified picture.

Figure 19:
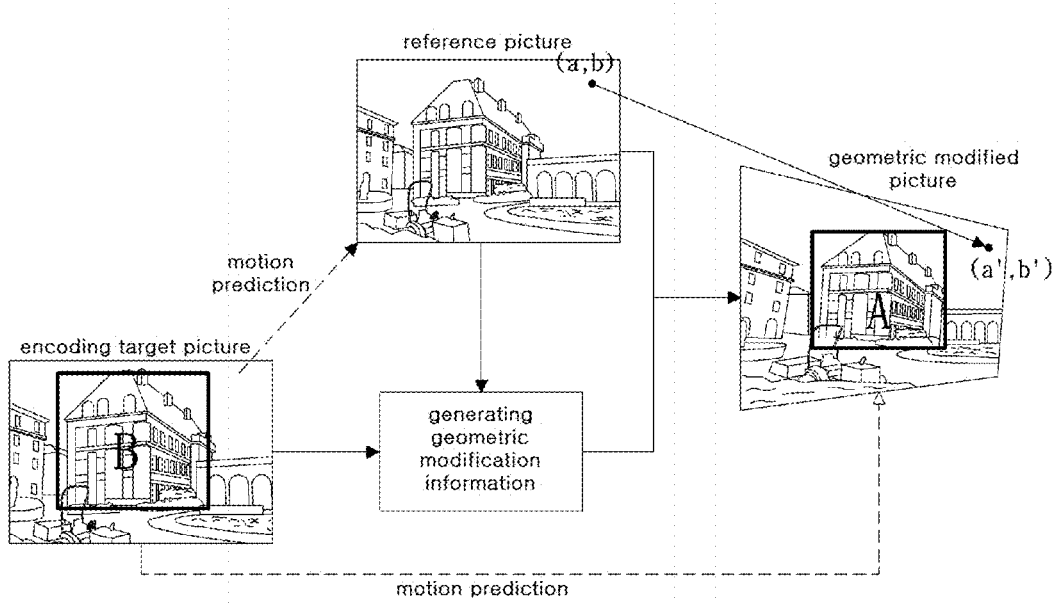
FIG. 19 is a diagram showing a method of performing motion prediction according to the present invention in which a video encoder generates geometric modification information and a geometric modified picture, and performs motion prediction by using a reference picture and the geometric modified picture

FIG. 19 is a diagram showing motion prediction in which a video encoder generates geometric modification information and performs motion prediction by using a reference picture and a geometric modified picture.

A geometric modified picture generator of the video encoder may generate geometric modification information from a reference picture. A geometric modified picture generator of the video encoder may generate a geometric modified picture by using the geometric modification information. The video encoder may store the generated geometric modified picture such that a geometric modified picture predictor uses the geometric modified picture as a reference signal. The geometric modified picture may be stored in at least one of a reconstructed picture buffer DPB of the video encoder, a reference picture list, and a geometric modified picture buffer. The geometric modified picture predictor of the video encoder may perform inter prediction that uses the generated geometric modified picture and/or the reference picture. The encoder including the geometric modified picture generator, the geometric modified picture buffer, and/or the geometric modified picture predictor will be described later.

As shown in FIG. 19, the geometric modification information may be generated based on an encoding target picture and the reference picture. The reference picture may be selected from a reference picture list configured with at least one already decoded reconstructed picture. The reference picture may be a reference picture having a global motion. The geometric modification information may be generated by reflecting a global motion between the encoding target picture and the reference picture having the global motion. The geometric modification information may be configured or generated in a unit of the entire image or a part of the image such as a frame, slice, block, etc. While generating the geometric modification information, the entirety of the global motion or a part thereof may be reflected. The global motion may be a motion related to a geometrical modification of an image described above such as a transfer, zoom-in, zoom-out, rotation, etc. The geometric modified picture may be generated based on the reference picture and generated geometric modification information. The geometric modified picture may be a geometric modified picture in which a global motion is reflected.

As a method of configuring geometric modification information related to a transfer, a zoom-in, a zoom-out, or a rotation of a pixel between an encoding target picture and a reference picture, a homography described with reference to FIG. 13 may be used. The homography may provide geometric modification information reflecting a rotation, a scaling, a transfer between two images to explain a two-dimensional geometrical modification relation of a planar object.

An image within a reference picture of FIG. 19 may be geometrically modified to an image within a geometric modified picture of FIG. 19 by rotating, zooming-in, zooming-out, or transferring the image by using geometric modification information. The reference picture of FIG. 19 and the geometric modified picture of FIG. 19 may have different shapes of rectangles by the geometric modification. An arbitrary coordinate within the reference picture of FIG. 19 (a,b) becomes (a', b') by a relational formula derived in FIG. 14, and the (a,b) may correspond to a coordinate (a', b') within the geometric modified picture of FIG. 19.

Therefore, the video encoder may generate an image that is similar to the encoding target picture from the reference picture by calculating the geometric modification information between the encoding target picture and the reference picture. In detail, similarity between an area A within the geometric modified picture of FIG. 19 and an area B within the encoding target picture of FIG. 19 is very high. In other words, pixel value similarity between the area A and the area B is very high, thus prediction accuracy of the encoder may be improved by referencing the geometric modified picture while performing motion prediction.

As described above, while performing inter prediction in the video encoder, the video encoder may reference the reference picture configured with already decoded pictures. However, since the reference pictures are not identical to the encoding target picture, there may be a change in a pixel value during a time interval between the reference picture and the encoding target picture. Therefore, it is preferable for the video encoder to reference the geometric modified picture that is generated based on the geometric modification information in which a change in a pixel value between the reference picture and the encoding target picture is reflected. The change in the pixel value may include, for example, something generated by the global motion. While performing the motion prediction, the best prediction signal may be generated by referencing the reference picture and the geometric modified picture.

In detail, pixel distribution similarity between the encoding target picture and the geometric modified picture is very high since the geometric modified picture is the image in which the change in pixel value between the reference picture and the encoding target picture is reflected. However, when a new pixel that is not present in a previous image occurs such as a new object appears in the image, or an error of the geometric modification information is large, an error or noise may occur in the geometric modified picture.

Herein, motion prediction that references the geometric modified picture may be degraded. Therefore, when performing motion prediction, first motion prediction is performed by referencing both of the reference picture and the geometric modified picture. Then, information having high prediction accuracy may be updated to the best prediction information. Accordingly, encoding performance degradation caused by the noise or the error in the geometric modified picture may be prevented. The video encoder may encode motion prediction information having the best encoding efficiency and transmit the encoded information through a bitstream. Herein, the video encoder may not encode geometric modification information of areas that are not referenced by the geometric modified picture. In other words, encoding efficiency may be improved by only encoding necessary geometric modification information.

Figure 20:
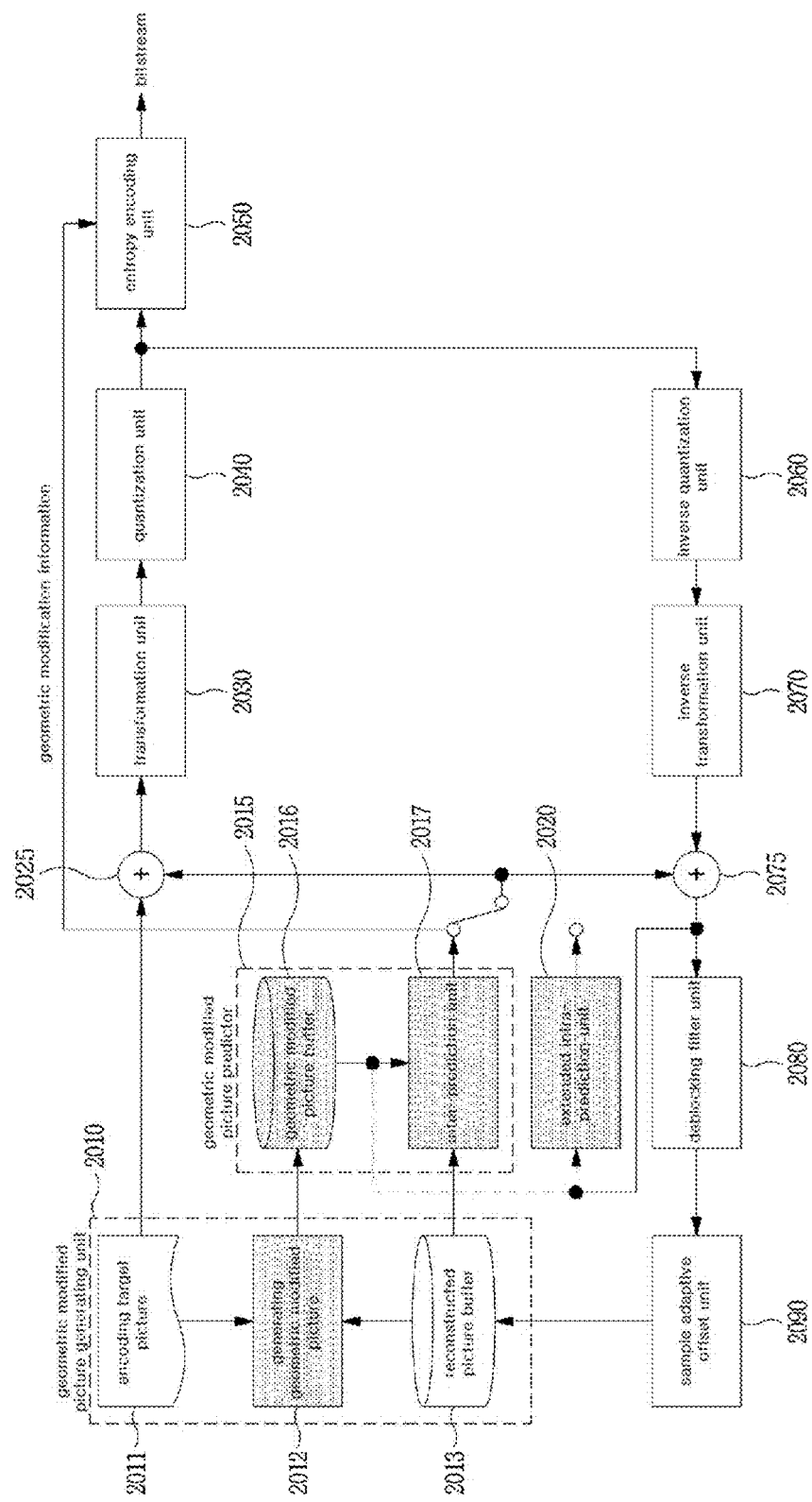
FIG. 20 is a block diagram showing a configuration of an image encoding apparatus to which another embodiment of the present invention is applied.

FIG. 20 is a block diagram showing a configuration of an image encoding apparatus to which another embodiment of the present invention is applied.

The encoding apparatus shown in FIG. 20 may include a geometric modified picture generating unit 2010, a geometric modified picture predictor 2015, an extended intra-prediction unit 2020, a subtractor 2025, a transformation unit 2030, a quantization unit 2040, an entropy encoding unit 2050, a inverse quantization unit 2060, an inverse transformation unit 2070, an adder 2075, a deblocking filter unit 2080, and a sample adaptive offset unit 2090.

The geometric modified picture generating unit 2010 may generate a geometric modified picture 2012 by calculating geometric modification information, the calculated geometric modification information reflects changes in pixel values between an encoding target picture 2011 and a reference picture of a reference picture list stored in a reconstructed picture buffer 2013. The generated geometric modified picture 2012 may be stored in a geometric modified picture buffer 2016.

The geometric modified picture predictor 2015 may include the geometric modified picture buffer 2016 and an inter-prediction unit 2017. The geometric modified picture buffer 2016 may store the geometric modified picture generated in the geometric modified picture generating unit 2010. The inter-prediction unit 2017 may perform motion prediction by using the reference pictures of the reference picture list stored in the reconstructed picture buffer 2013 as reference signals. When the geometric modified picture is referenced while performing motion prediction, geometric modification information that is used for generating the geometric modified picture may be transmitted to and encoded in the entropy encoding unit 2050.

The geometric modified picture generating unit 2010 may perform a reconfiguration of geometric modification information that will be described later. The reconfiguration of geometric modification information may be performed when generating a geometric modified picture.

The extended intra-prediction unit 2020 may perform extended intra prediction by referencing already encoded/decoded signals of a current picture and the geometric modified picture. The extended intra-prediction unit 2020 will be described later.

Figure 21:
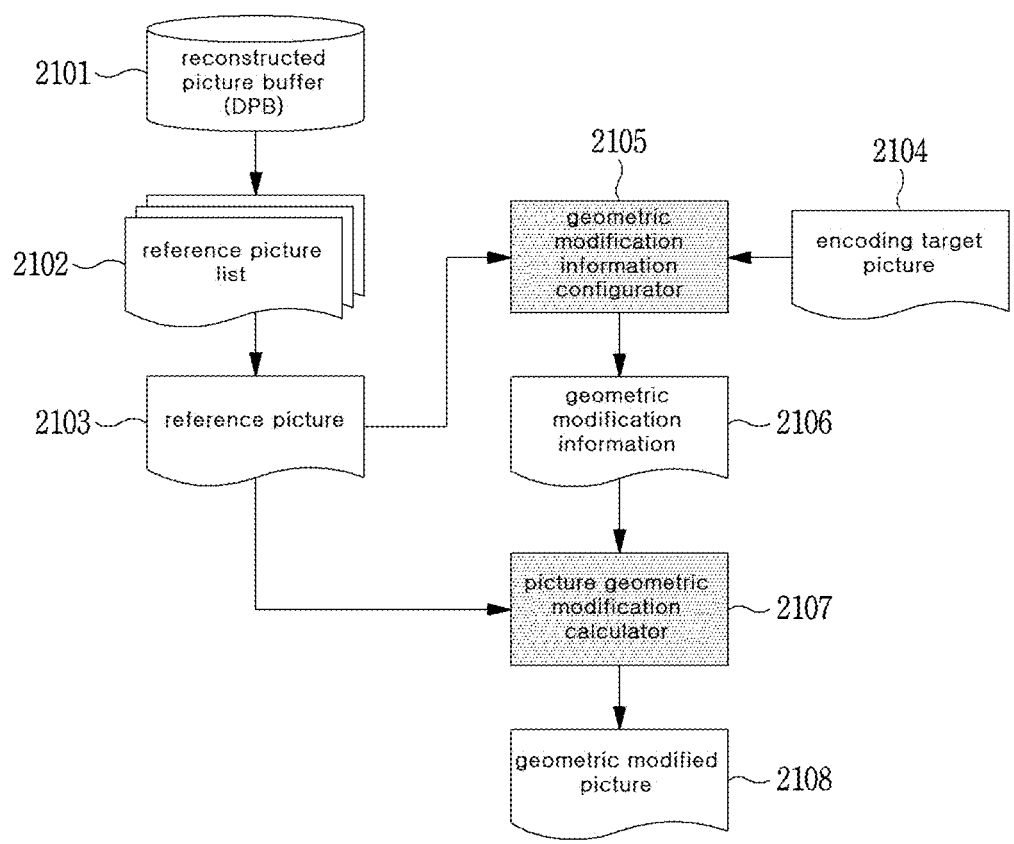
FIG. 21 is a diagram showing a configuration and an operation of a geometric modified picture generating unit 2010 according to the example encoding apparatus shown in FIG. 20.

FIG. 21 is a diagram showing a configuration and an operation of the geometric modified picture generating unit 2010 according to the example encoding apparatus shown in FIG. 20.

The geometric modified picture generating unit 2010 may generate a geometric modified picture 2108 that may be used as a reference signal in the geometric modified picture predictor 2015. A geometric modification information configurator 2105 may configure geometric modification information 2106 by receiving a reference picture 2103 of a reference picture list 2102 configured by a reconstructed picture buffer 2101 and an encoding target picture 2104. A picture geometric modification calculator 2107 may generate the geometric modified picture 2108 by modifying the reference picture 2013 by using the geometric modification information 2106.

The geometric modification information configurator 2105 may calculate a change in a pixel value between the reference picture 2103 and the encoding target picture 2104, and particularly, global motion information. The geometric modification information configurator 2105 may find matched feature points between the two images, and calculate motion information by calculating changes in transfer, rotation, and/or size between the matched feature points. The geometric modification information configurator 2105 may configure and output the geometric modification information capable of generating the geometric modified picture based on the calculated global motion information.

The picture geometric modification calculator 2107 may receive the reference picture 2103 and the geometric modification information 2106 to generate the geometric modified picture 2108. The picture geometric modification calculator 2107 may generate the geometric modified picture 2108 from the reference picture 2103 by using the geometric modification information 2106. The generated geometric modified picture 2108 may be stored in the geometric modified picture buffer 2016 and may be referenced by the inter-prediction unit 2017 while performing inter prediction.

Figure 22:
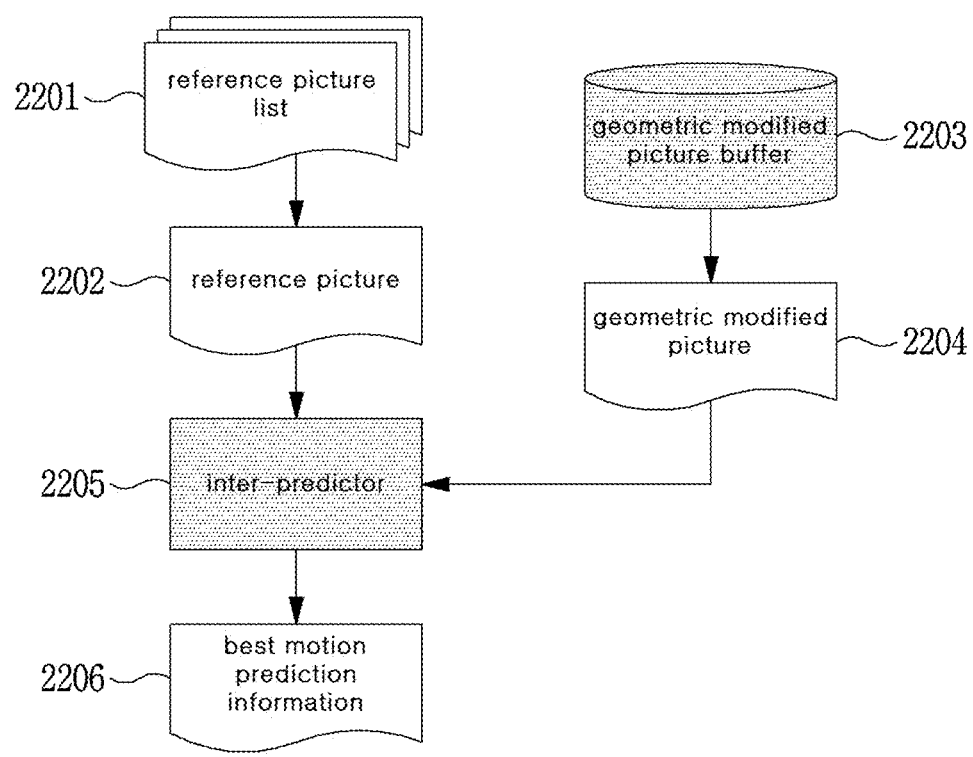
FIG. 22 is a diagram showing a configuration and an operation of a geometric modified picture predictor 2015 according to the example encoding apparatus shown in FIG. 20.

FIG. 22 is a diagram showing a configuration and an operation of the geometric modified picture predictor 2015 according to the example encoding apparatus shown in FIG. 20.

A reference picture 2202 of a reference picture list 2201 and a geometric modified picture 2204 of a geometric modified picture buffer 2203 may be input to an inter-predictor 2205 and used as a reference signal of motion prediction.

The inter-predictor 2205 may derive the best motion prediction information 2206 by referencing both of the reference picture 2202 and the geometric modified picture 2204 while performing motion prediction. The best motion prediction information 2206 may refer to motion prediction information with high prediction accuracy and the best encoding efficiency. When the best motion prediction information 2206 is derived by referencing the geometric modified picture 2204, geometric modification information may be encoded and transmitted through a bitstream.

The configuration of the encoding apparatus shown with reference to FIGS. 20 to 22 is only one of various embodiments of the present invention, and it is no limited thereto. Some of the configurations of the encoding apparatus shown in FIGS. 20 to 22 may be merged or omitted with other configurations. Alternatively, additional configurations may be added. In addition, a part of the plurality of configurations included in the geometric modified picture generating unit 2010 and the geometric modified picture predictor 2015 may be independently configured from the geometric modified picture generating unit 2010 and the geometric modified picture predictor 2015. Alternatively, it may be included in a sub-configuration of another configuration or merged with another configuration.

Figure 23:
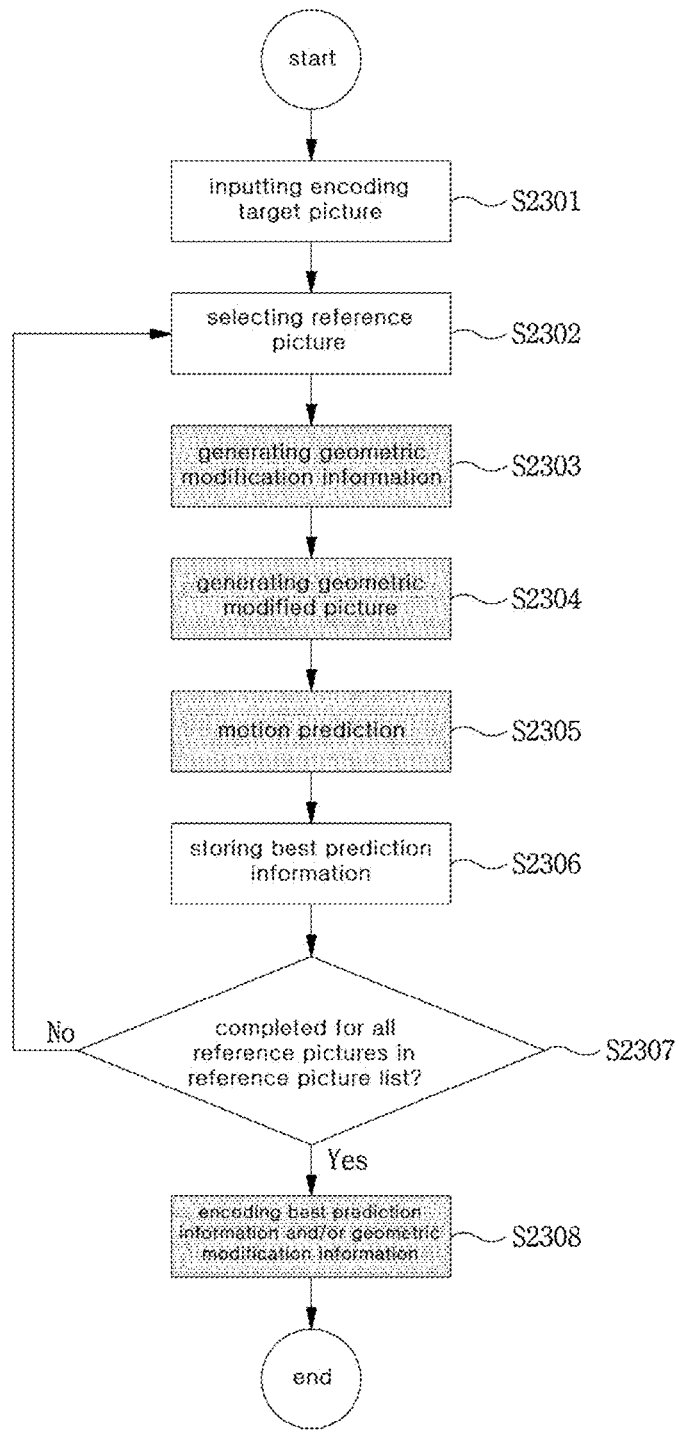
FIG. 23 is a flow chart showing motion prediction according to an embodiment of the present invention.

FIG. 23 is a flow chart showing motion prediction according to an embodiment of the present invention.

In steps S2301 and S2302, an encoding target picture and a reference picture may be specified. The reference picture may be selected from a reference picture list.

In step S2303, geometric modification information may be generated based on the encoding target picture and the reference picture. The geometric modification information may be generated by using the above method.

In step S2304, a geometric modified picture may be generated based on the generated geometric modification information. The generated geometric modified picture may be stored in a geometric modified picture buffer.

In step S2305, motion prediction may be performed by referencing the reference picture and/or the geometric modified picture.

In step S2306, the best prediction information may be stored and updated based on a reference signal having the best encoding efficiency. As an indicator for determining the best encoding efficiency, a rate-distortion cost (RD Cost) may be used.

In step S2307, steps S2302 to S2306 are repeated when all of the reference pictures are not applied to steps S2301 to S2306. In step S2308, when all of the reference pictures are applied, the best motion prediction information that is finally determined and/or the geometric modification information may be encoded. The geometric modification information may be only encoded and transmitted when the geometric modified picture is used while performing motion prediction.

Figure 24:
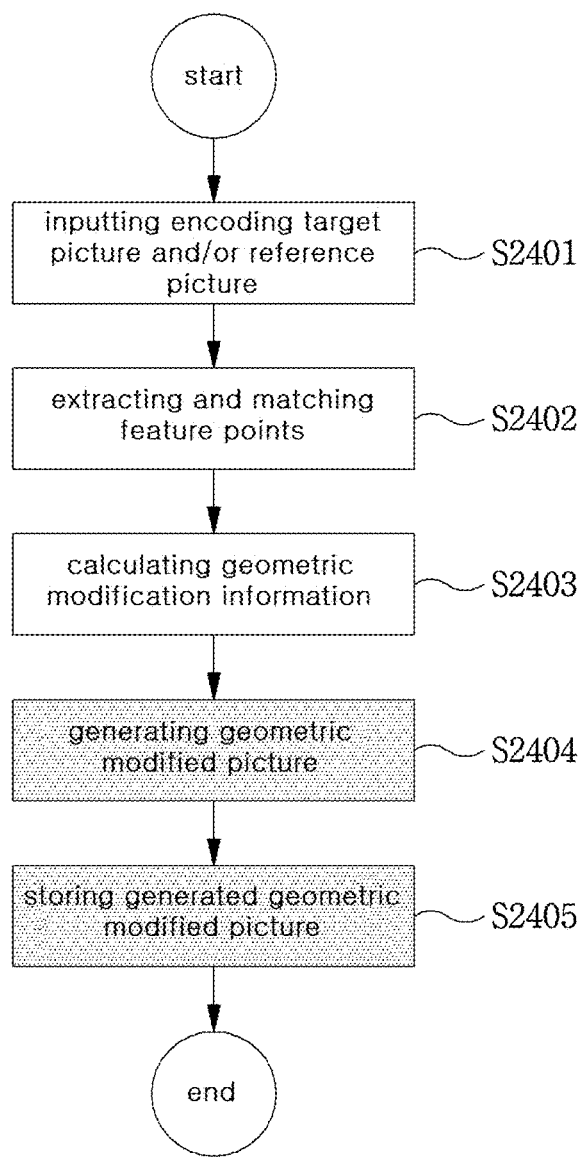
FIG. 24 is a flow chart showing a method of generating a geometric modified picture according to an embodiment of the present invention.

FIG. 24 is a flow chart showing a method of generating a geometric modified picture according to an embodiment of the present invention.

In step S2401, the generation method may receive an input of an encoding target picture and a reference picture that is selected from a reference picture list.

In step S2402, the generation method may extract feature points from the two pictures and match the extracted feature points. The extracted feature points may be used for calculating a change in a pixel value between two pictures, and particularly, global motion information. The feature points may refer to a pixel that is capable of being distinguished from neighboring pixels, as described above. In step S2403, geometric modification information, in which a rotation, zoom-in, zoom-out, and/or transfer of the feature points within the two images is reflected, may be calculated by matching the extracted feature points. The geometric modification information may be calculated by using various algorithms, for example, a homography of FIG. 13 may be used.

In step S2404, the generation method may generate the geometric modified picture. The geometric modified picture may be generated by deriving each pixel corresponding to each pixel of the reference picture within the geometric modified picture by applying geometric modification information to each pixel of the reference picture.

In step S2405, the generation method may store the generated geometric modified picture. For example, the generated geometric modified picture may be stored in a geometric modified picture buffer. However, it is not limited thereto, and the geometric modified picture may be stored in a reconstructed picture buffer or in the reference picture list.

Figure 25:
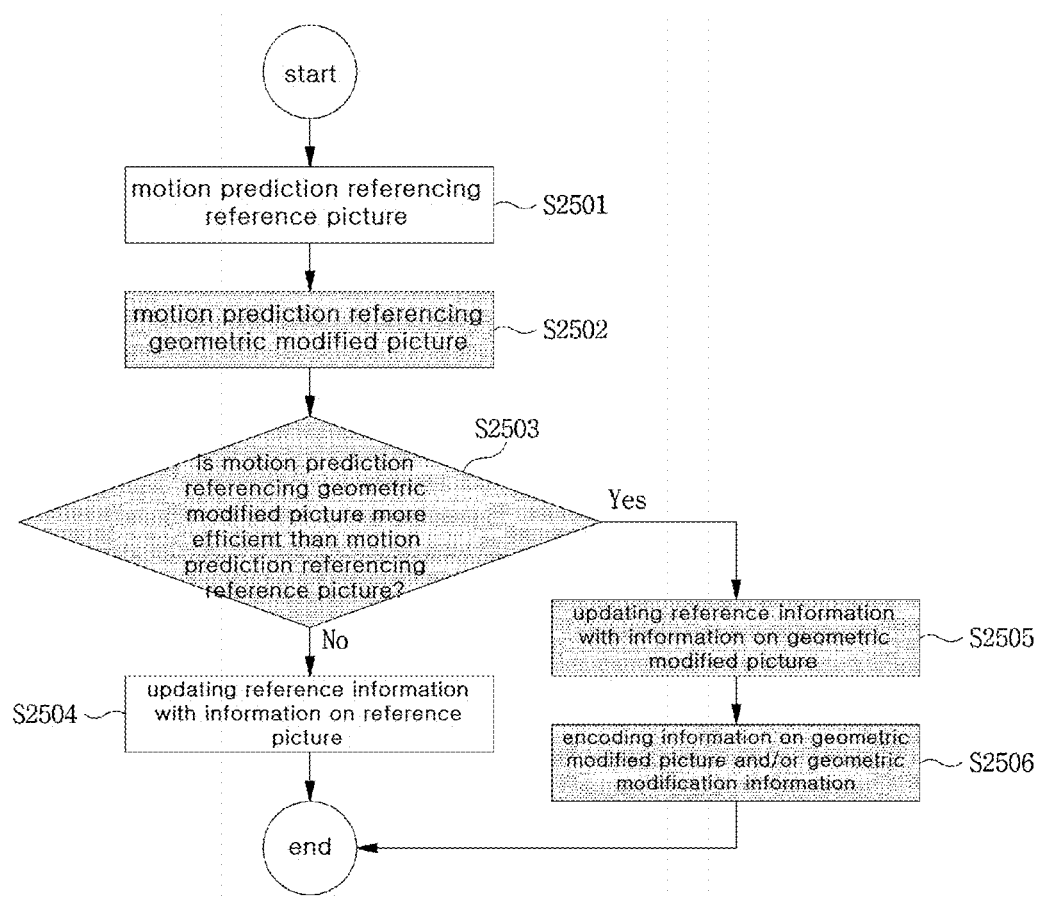
FIG. 25 is a flow chart showing an inter-prediction method according to an embodiment of the present invention.

FIG. 25 is a flow chart showing an inter-prediction method according to an embodiment of the present invention.

In steps S2501 and S2502, the inter-prediction method may perform motion prediction by referencing a reference picture and motion prediction by referencing a geometric modified picture. Orders of motion prediction are not limited thereto. In other words, motion prediction by referencing the geometric modified picture may be performed first. Alternatively, both of motion predictions may be performed at the same time. The reference picture may be selected from a reference picture list.

In step S2503, the inter-prediction method may determine which of the motion prediction referencing the reference picture and the motion prediction referencing geometric modified picture is more efficient.

In the step S2504, the inter-prediction method may store or update the reference picture information as the best prediction information when motion prediction referencing the reference picture is determined in step S2503.

In the step S2505, the inter-prediction method may store or update the geometric modified picture information as the best prediction information when motion prediction referencing the geometric modified picture is determined in step S2503.

In step S2506, the inter-prediction method may encode geometric modification information when geometric modified picture information is finally encoded as the best prediction information.

Figure 26:
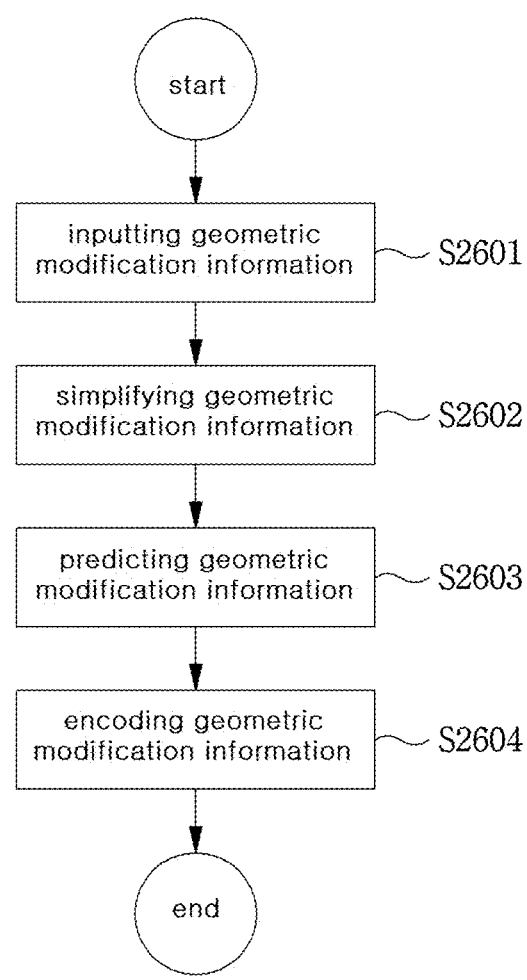
FIG. 26 is a flow chart showing an encoding method of geometric modification information according to an embodiment of the present invention.

Referring to FIGS. 26 and 27, a method of efficiently encoding geometric modification information is described.

The geometric modification information may be configured with a plurality of factors such as a matrix of FIG. 14. In addition, the factors may be real numbers. Encoding efficiency may be degraded when a large amount of bits are used for encoding a matrix configured with real number factors. Various methods may be applied to reduce the amount of bits while transmitting geometric modification information. For example, the real number factors may be approximated to integer number factors. Alternatively, the geometric modification information may be simplified by reducing a part of the generated geometric modification information. Alternatively, a residual value between the geometric modification information and geometric modification information that is previously used by predicting the previously used geometric modification information may be only transmitted. Various methods may be used for reducing the amount of bits other than the described method. Alternatively, one or more of the methods described above may be applied together.

FIG. 26 is a flow chart showing an encoding method of geometric modification information according to an embodiment of the present invention.

In step S2601, the encoding method may receive an input of encoding target geometric modification information.

In step S2602, the encoding method may simplify the geometric modification information. In step S2603, the encoding method may predict the geometric modification information. The steps S2602 and S2603 may be reversely performed. Alternatively, one of the steps S2602 and S2603 may be selectively performed.

In step S2602, the geometric modification information may be simplified by approximating real number factors configuring the geometric modification information to integer number factors. A number of bits expressing the factors may be reduced by the approximation. In order to reduce the number of bits, various operations such as rounding up or down, raising, lowering, abandoning, cutting based on a predetermined number of digits may be used. As an example of the approximation, real numbers may be converted to integer numbers.

In step S2603, the encoding method may predict the geometric modification information from geometric modification information that was previously used. The encoding method may transmit residual value between the predicted and previously used information. The previously used geometric modification information may refer to geometric modification information that was used just before or geometric modification information of a picture that was previously encoded. When multiple geometric modification information is available for predicting the geometric modification information, the encoding method may additionally encode information indicating the referenced geometric modification information. Herein, a decoder may determine the referenced geometric modification information based on the additionally transmitted information, and decode the geometric modification information based on the information. The encoding method may not additionally transmit information indicating the referenced geometric modification information when only particular geometric modification information, for example, the geometric modification information that was used just before, is referenced as the geometric modification information.

In step S2604, the encoding method may encode information that is necessary for reconstructing the geometric modification information.

FIG. 27 is a diagram showing various examples for modifying geometric modification information to reduce a bit amount used for encoding the geometric modification information.

FIG. 27(1) is an example of converting real number factors to integer number factors.

FIG. 27(2) is an example in which geometric modification information is simplified by removing a part thereof. Among the removed factors, 0.1 and 0.7 that are factors of left side are factors that are used for a projective modification described with reference to FIG. 12. Factors used for the projective modification statistically occur at small values close to zero. Factors close to zero have a small effect when generating a geometric modified picture. Therefore, even if it is omitted, it does not adversely affect the accuracy of the geometric modified picture. In addition, among the three removed factors, the right-most factor 1 may not be transmitted to the decoder since it is always fixed to 1 while generating the geometric modification information.

FIG. 27(3) is an example of configuring geometric modification information B by multiplying a coefficient 2 to geometric modification information A. The geometric modification information A and the coefficient 2 may be transmitted to the decoder rather than transmitting geometric modification information A and B. The modification information B may be reconstructed by the transmitting geometric modification information A and the coefficient 2.

FIG. 27(4) is an example of configuring geometric modification information B by using geometric modification information A as reference geometric modification information. Geometric modification information A and residual geometric modification information Bd are encoded. The Bd may correspond to a difference value between geometric modification information A and B. The decoder may reconstruct the geometric modification information B by adding the geometric modification information A and the Bd.

Figure 28:
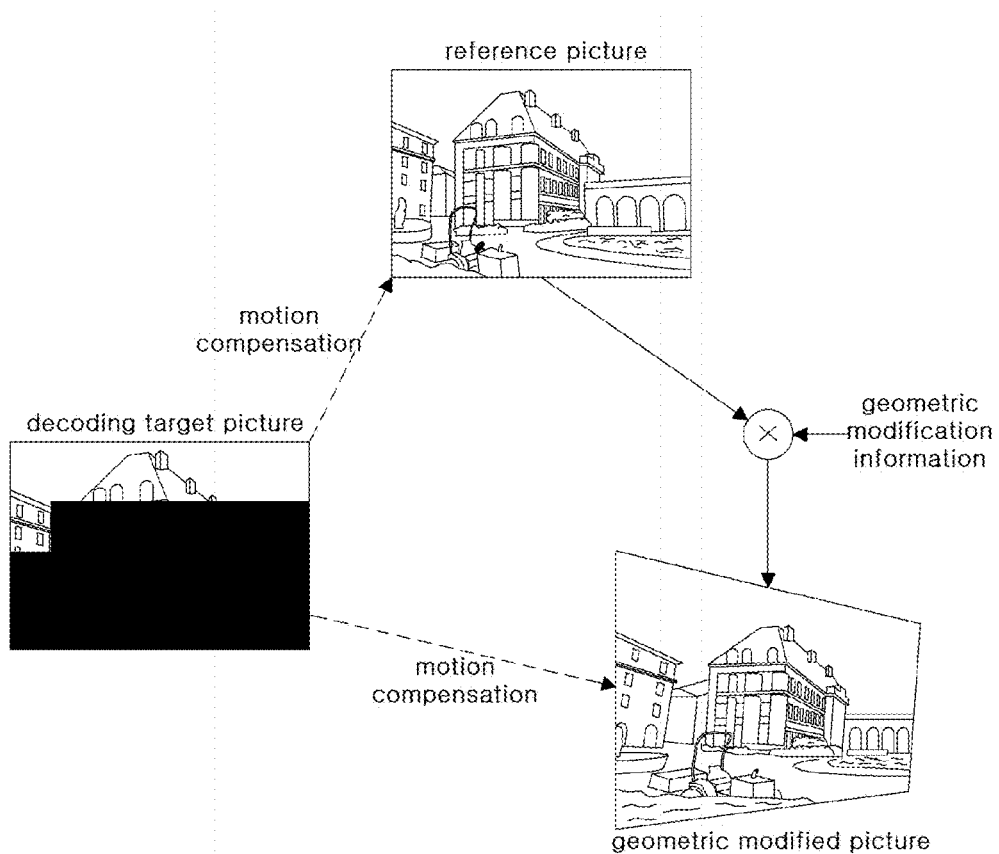
FIG. 28 is a diagram showing a method of motion compensation in which a decoder generates a geometric modified picture from a reference picture by using geometric modification information, and performs motion compensation by using the reference picture and the geometric modified picture.

FIG. 28 is a diagram showing a method of motion compensation in which a decoder generates a geometric modified picture from a reference picture by using geometric modification information, and performs motion compensation by using the reference picture and the a geometric modified picture.

A video decoder according to the present invention may receive geometric modification information generated by a video encoder through a bitstream.

The video decoder may generate a geometric modified picture by applying the geometric modification information to a reference picture selected from a reference picture list. The geometric modified picture may be generated by a geometric modified picture generator of the decoder that will be described later. A unit of the geometric modified picture generated by the geometric modified picture generator may vary according to the unit determined while encoding the geometric modified picture, the unit may be a frame, a slice, a block, etc.

The method of generating the geometric modified picture by applying the geometric modification information to the reference picture may correspond to the method of generating the geometric modified picture in the encoder as described above. However, the decoder receives the geometric modification information through the bitstream, unlikely the video encoder. Thus, a configuration complexity of the video decoder is not increased significantly. The generated geometric modified picture may be stored in a geometric modified picture buffer that will be described later.

The video decoder may reference both of the reference picture and the geometric modified picture for inter prediction of a decoding target picture. Inter prediction referencing the reference picture and/or the geometric modified picture may be performed by inter-prediction unit of the decoder that will be described later. The inter-prediction unit of the decoder may perform inter prediction by using a reference picture of a reconstructed picture buffer DPB and/or a geometric modified picture of a geometric modified picture buffer as a reference signals.

Information whether to use the reference picture or the geometric modified picture for inter prediction of the decoding target picture or a decoding target area may be signaled through the bitstream. Such information may be signaled by an additional syntax element. Alternatively, such information may be signaled by a presence of the geometric modification information.

The video decoder may receive the geometric modification information, generate the geometric modified picture, and/or perform inter prediction by referencing the geometric modified picture based on information that indicates the decoding target picture or the decoding target area is predicted by referencing the geometric modified picture.

The video decoder may not receive the geometric modification information, not generate the geometric modified picture, and/or not perform inter prediction by referencing the geometric modified picture based on information that indicates the decoding target picture or the decoding target area is predicted by referencing the reference picture.

Figure 29:
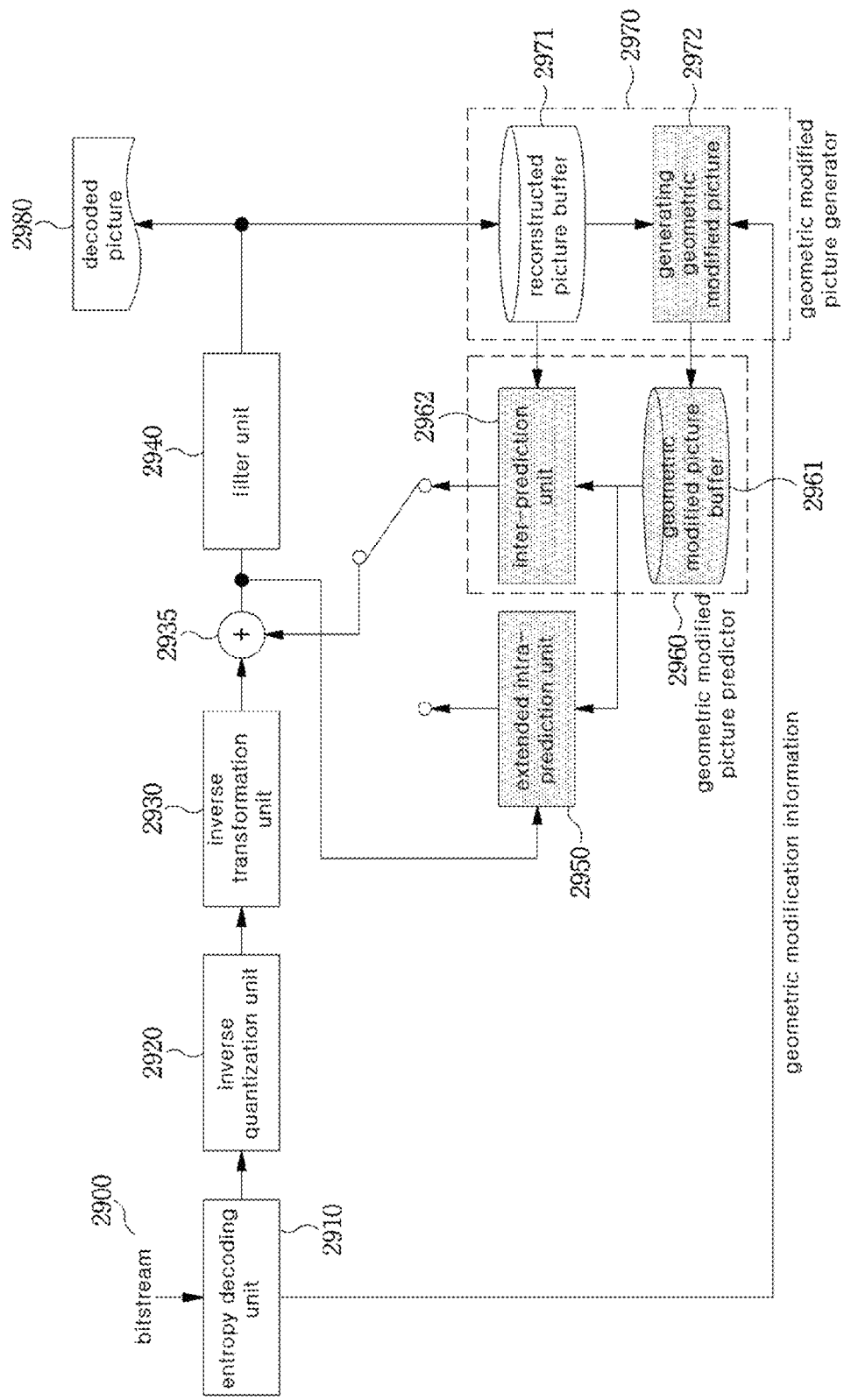
FIG. 29 is a block diagram showing a configuration of a decoding apparatus to which another embodiment of the present invention is applied.

FIG. 29 is a block diagram showing a configuration of a decoding apparatus to which another embodiment of the present invention is applied The decoder shown in FIG. 29 may include an entropy decoding unit 2910, an inverse quantization unit 2920, an inverse transformation unit 2930, a subtractor 2935, a filter unit 2940, an extended intra-prediction unit 2950, a geometric modified picture predictor 2960, and a geometric modified picture generator 2970. The decoder may output a decoded picture 2980 by receiving a bitstreams 2900.

The geometric modified picture generator 2970 may generate a geometric modified picture 2972 by using geometric modification information that is extracted from the bitstream 2900 and a reference picture of a reference picture list that is stored in a reconstructed picture buffer 2971 and is entropy decoded.

The geometric modified picture predictor 2960 may be configured with a geometric modified picture buffer 2961 for storing the geometric modified picture 2972, and an inter-prediction unit 2962.

The geometric modified picture 2972 generated in the geometric modified picture generator 2970 may be stored in the geometric modified picture buffer 2961. The geometric modified picture 2972 stored in the geometric modified picture buffer 2961 may be used as reference signals in the inter-prediction unit 2962.

The inter-prediction unit 2962 may reconstruct the decoding target picture by using the reference picture and/or the geometric modified picture as a reference signal for motion prediction based on the information transmitted from the encoder.

Figure 30:
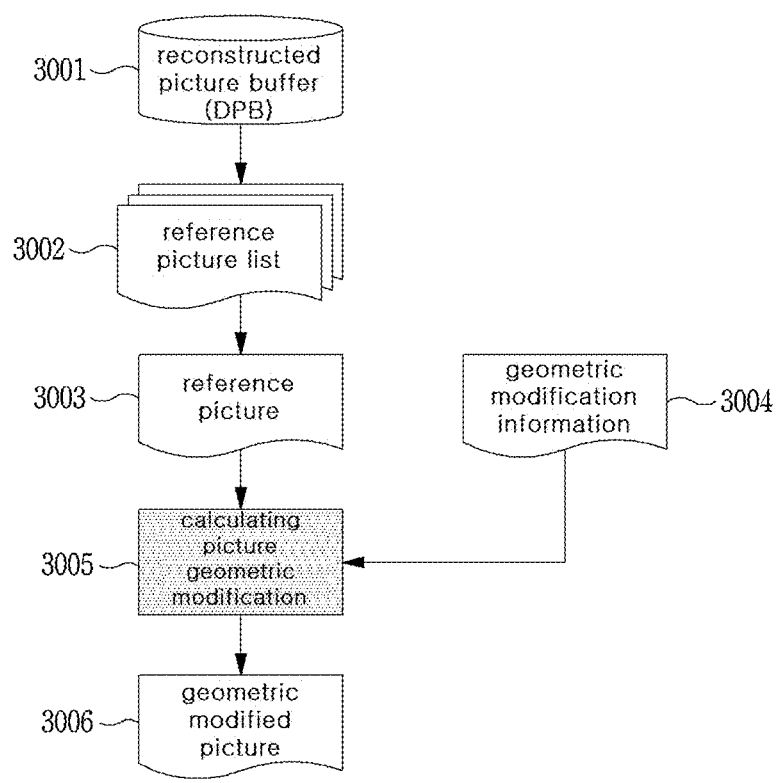
FIG. 30 is a diagram showing an operation and configuration of a geometric modified picture generator 2970 of the decoding apparatus shown in FIG. 29.

FIG. 30 is a diagram showing an operation and configuration of the geometric modified picture generator 2970 of the decoding apparatus shown in FIG. 29.

A geometric modification calculator 3005 of the geometric modified picture generator 2970 may generate a geometric modified picture 3006 by receiving geometric modification information 3004 and a reference picture 3003. The reference picture 3003 may be selected from a reference picture list 3002 configured from a reconstructed picture buffer 3001. Information for selecting the reference picture 3003 may be included in and transmitted through a bitstream. The information for selecting the reference picture 3003 may be transmitted as an additional syntax element, or may be explicitly or implicitly included in the geometric modification information 3004.

The generated geometric modified picture 3006 may be output to the geometric modified picture buffer 2961 as described above.

Figure 31:
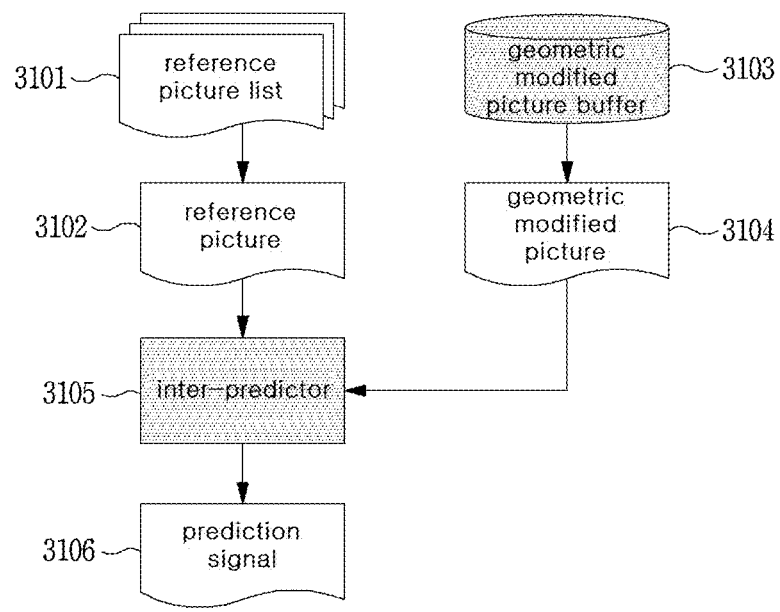
FIG. 31 is a diagram showing an operation and configuration of a geometric modified picture predictor 2960 of the decoding apparatus shown in FIG. 29.

FIG. 31 is a diagram showing an operation and configuration of the geometric modified picture predictor 2960 of the decoding apparatus shown in FIG. 29.

An inter-predictor 3105 of the geometric modified picture predictor 2960 may perform inter prediction by referencing a reference picture 3102 and/or a geometric modified picture 3104, and output a prediction signal 3106. Information whether to use the reference picture 3102 or the geometric modified picture 3106 for inter prediction of the decoding target picture or a decoding target arca or to use both thereof may be signaled through a bitstream. As described above, such information signaling may be performed by an additional syntax element. Alternatively, such information signaling may be performed by a presence of the geometric modification information.

The reference picture 3102 may be selected from a reference picture list 3101. The geometric modified picture 3104 may be selected from a geometric modified picture buffer 3103. The geometric modified picture 3104 may be configured with a part that is necessary for inter prediction.

The configuration of the decoding apparatus shown with reference to FIGS. 29 to 31 is only one of various embodiments of the present invention, but it is no limited thereto. Some of the configurations of the encoding apparatus shown in FIGS. 29 to 31 may be merged or omitted with other configurations. Alternatively, additional configurations may be added. In addition, a part of the plurality of configurations included in the geometric modified picture generator 2970 and the geometric modified picture predictor 2060 may be independently configured from the geometric modified picture generator 2970 and the geometric modified picture predictor 2960. Alternatively, it may be included in a sub-configuration of another configuration or merged with another configuration.

Figure 32:
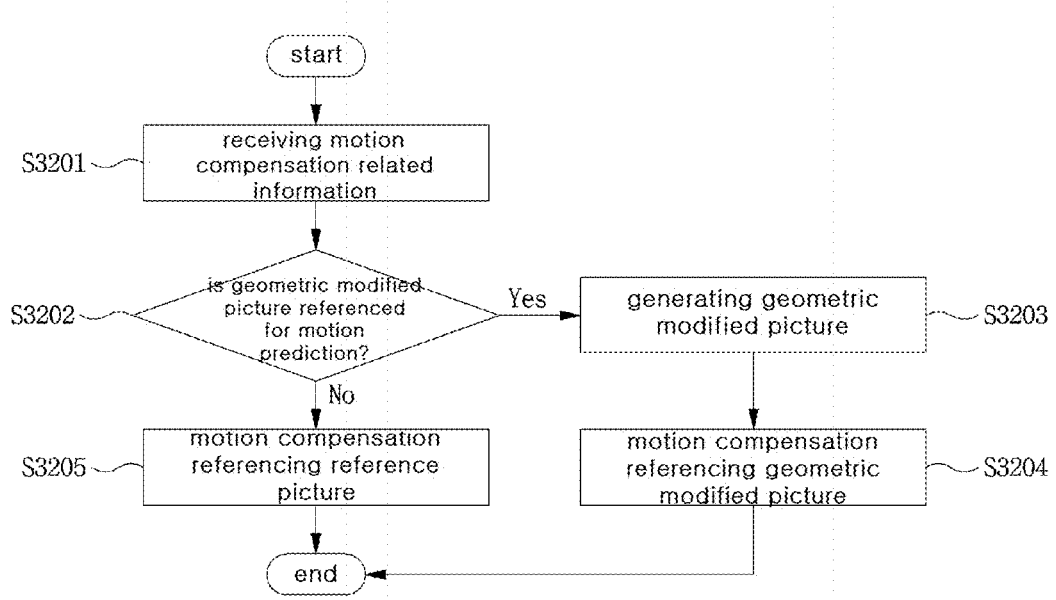
FIG. 32 is a flow chart showing motion compensation of the decoder according to the embodiment of the present invention.

FIG. 32 is a flow chart showing motion compensation of the decoder according to the embodiment of the present invention.

In step S3201, the decoder may obtain motion compensation related information by parsing a bitstream. The motion compensation related information may include at least one of reference picture information, and geometric modification information. The reference picture information may be information that specifies one reference picture within reference pictures included in a reference picture list. Alternatively, the reference picture information may be information indicating whether a reference image or a geometric modified picture is used while performing motion compensation. Alternatively, the reference picture information may be information indicating whether or not both of the reference image and the geometric modified picture are used while performing motion compensation. Alternatively, the reference picture information may be information including at least two information of the above information. The reference picture information may be signaled by a single syntax element, or by multiple single syntax elements. The reference picture information may be signaled by a method explicitly or implicitly defined by the encoder and the decoder. Whether the reference picture or the geometric modified picture is referenced during inter prediction may be signaled by the presence of geometric modification information.

In step S3202, based on the motion compensation related information, the decoder may determine if the geometric modified picture is referenced while performing motion compensation. The decoder may make the decision based on the reference picture information and/or the presence of the geometric modification information as described above. When the decoder uses the presence of the geometric modification information, for example, when geometric modification information is received, the decoder may determine that motion prediction is performed by referencing the geometric modified picture.

If "yes" in step S3202, in step S3203, the decoder may generate the geometric modified picture. The geometric modified picture may be generated based on the reference picture selected from the reference picture list and geometric modification information parsed from the bitstream. Herein, the decoder may generate a part of the geometric modified picture that is necessary for motion compensation.

In step S3204, the decoder may perform motion compensation by referencing the generated geometric modified picture.

Alternatively, if "no" in step S3202, in step S3205, the decoder may perform motion compensation by referencing the reference picture selected from the reference picture list.

In step S3203, motion compensation explained with reference to FIG. 32 generates the geometric modified picture based on whether or not the geometric modified picture is used (S3202). However, it is not limited thereto, and when geometric modification information is received, the decoder may generate geometric modified picture regardless of the reference thereof.

As described above, the geometric modified picture may be generated from the reference picture by using the geometric modification information. Whereby inter-prediction accuracy may be improved by referencing the reference picture and/or the geometric modified picture while performing inter prediction.

A prediction using the geometric modified picture is not limited to inter prediction. For example, intra prediction may be performed by using the geometric modified picture.

Hereinafter, extended intra prediction using a geometric modified picture according to an embodiment of the present invention is described with reference to FIGS. 33 to 37.

Figure 33:
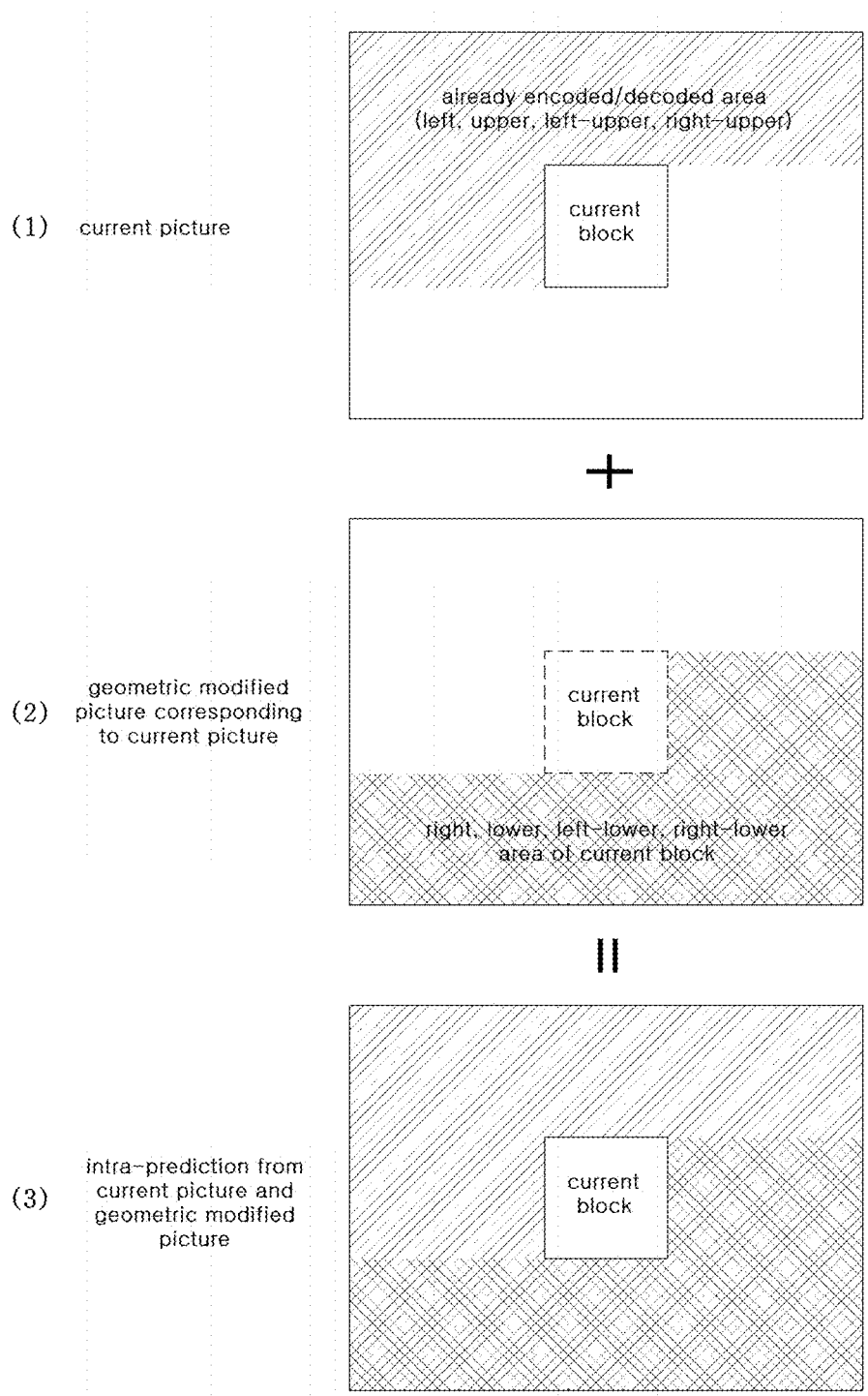
FIG. 33 is a conceptual diagram showing extended intra prediction according to an embodiment of the present invention

FIG. 33 is a conceptual diagram showing extended intra prediction according to an embodiment of the present invention. In FIG. 33, a current block may refer to a decoding target bock.

As shown in FIG. 33(1), an area that is an already decoded area of a current block may be referenced for intra prediction of the current block. In other words, a left area, an upper area, a left-upper area, and/or a right-upper area of the current block may be referenced for intra prediction. However, a right area, a lower area, a left-lower area, and/or a right-lower area of the current block may not be referenced for intra prediction since these areas are not decoded yet.

As shown in FIG. 33(2), for the right area, the lower area, the left-lower area, and/or the right-lower area of the current block that are not capable of being referenced, a signal corresponding a picture that is already decoded of the current picture or a signal corresponding to a geometric modified picture generated by geometrically modifying the picture that is already decoded may be referenced as a reference signal of intra prediction. The geometric modified picture may be a geometric modified picture generated by reconfiguring a reference picture of the current picture by using geometric modification information such that the reconfigured referenced picture may be similar to the current picture.

As shown in FIG. 33(3), by using all reference signals of FIGS. 33(1) and 33(2), all reference signals of areas surrounding the current block may be obtained. Therefore, intra prediction of the current block may be performed in all directions (left, right, left-upper, right-upper, right, lower, left-lower, and/or right-lower area of the current block) Therefore, intra-prediction efficiency may be improved.

Figure 34:
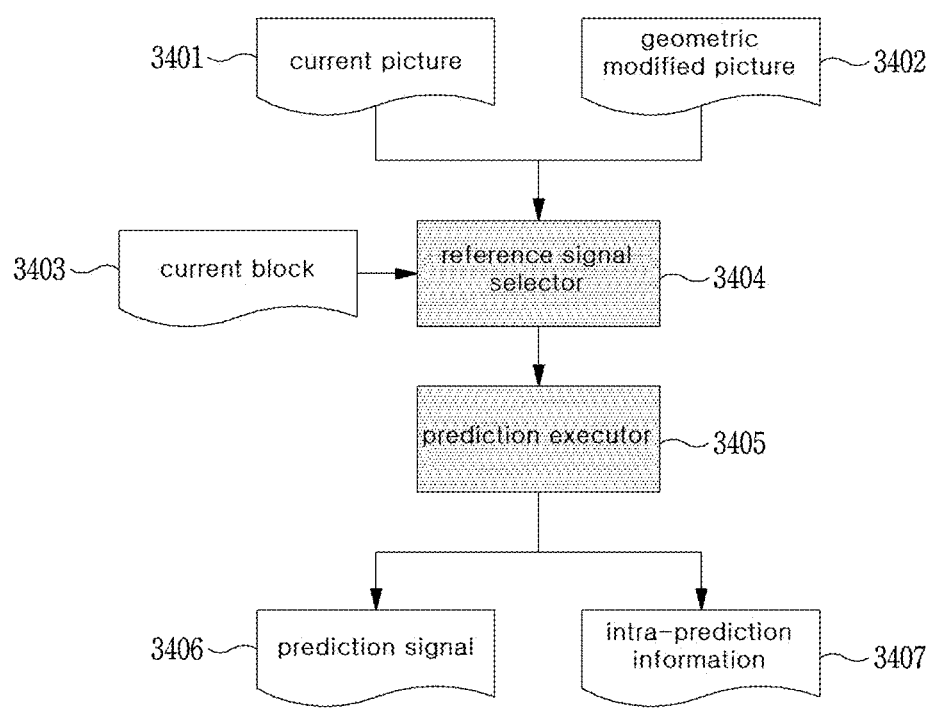
FIG. 34 is a diagram showing an operation and a configuration of an extended intra-prediction unit according to an embodiment of the present invention.

FIG. 34 is a diagram showing an operation and a configuration of an extended intra-prediction unit according to an embodiment of the present invention.

The extended intra-prediction unit of FIG. 34 may correspond to the extended intra-prediction unit of the encoder shown in FIG. 20.

The extended intra-prediction unit may include a reference signal selector 3404 and a prediction executor 3405. The reference signal selector 3404 may receive a current block 3403 that is a decoding target. In addition, the reference signal selector 3404 may receive a current picture 3401 and/or a geometric modified picture 3402 that are used as a reference signal of intra prediction. The received current picture 3401 may be a signal of an area that is encoded/decoded earlier than a current block 3403. The received geometric modified picture 3402 may be a reference picture of the current picture 3401. Alternatively, the received geometric modified picture 3402 may be a geometric modified picture generated by geometrically modifying the reference picture of the current picture 3401 by using geometric modification information. Information about the current block 3403 received by the reference signal selector 3404 may be information about a position and/or a size of the current block 3403 within the current picture 3401. The reference signal selector 3404 may select a reference signal from the current picture 3401 and the geometric modified picture 3402. Alternatively, the reference signal selector 3404 may select either the current picture 3401 or the geometric modified picture 3402. For example, when intra prediction is performed from a right area of the current block 3403, the reference signal selector 3404 may select the geometric modified picture 3402 as the reference picture.

The prediction executor 3405 may perform intra prediction when the reference picture is selected, and generate a prediction block (prediction signal 3406) of the current block 3403. In addition, the decoder may generate intra-prediction information 3407 that is necessary for intra prediction. The intra-prediction information 3407 may include an intra-prediction direction or a reference signal, etc.

Intra prediction may be performed for all available reference signals, and a reference signal having the best efficiency may be selected.

The extended intra-prediction unit of the decoder may selectively reference an already decoded area of the current picture or a geometric modified picture (or reference picture) based on the intra-prediction information transmitted from the encoder. For example, when an intra-prediction direction indicated by the intra-prediction information is a right area of the current block, the extended intra-prediction unit may perform intra prediction by using the geometric modified picture. The decoder may only generate the geometric modified picture when the geometric modified picture is referenced. Information about whether or not the geometric modified picture is used may be determined by the intra-prediction direction as described above. Alternatively, the information about whether or not the geometric modified picture is used may be determined by a presence of geometric modification information. Alternatively, the information about whether or not the geometric modified picture is used may be signaled by additional one or more syntax elements, or may be signaled by a method explicitly or implicitly defined by the encoder and the decoder.

In addition, a method of generating geometric modified picture that is referenced during intra prediction according to the present invention may be the same as the method of generating the geometric modified picture that is referenced during inter prediction according to the present invention. In addition, methods of configuring and using geometric modification information may be the same as the methods of inter prediction.

Figure 35:
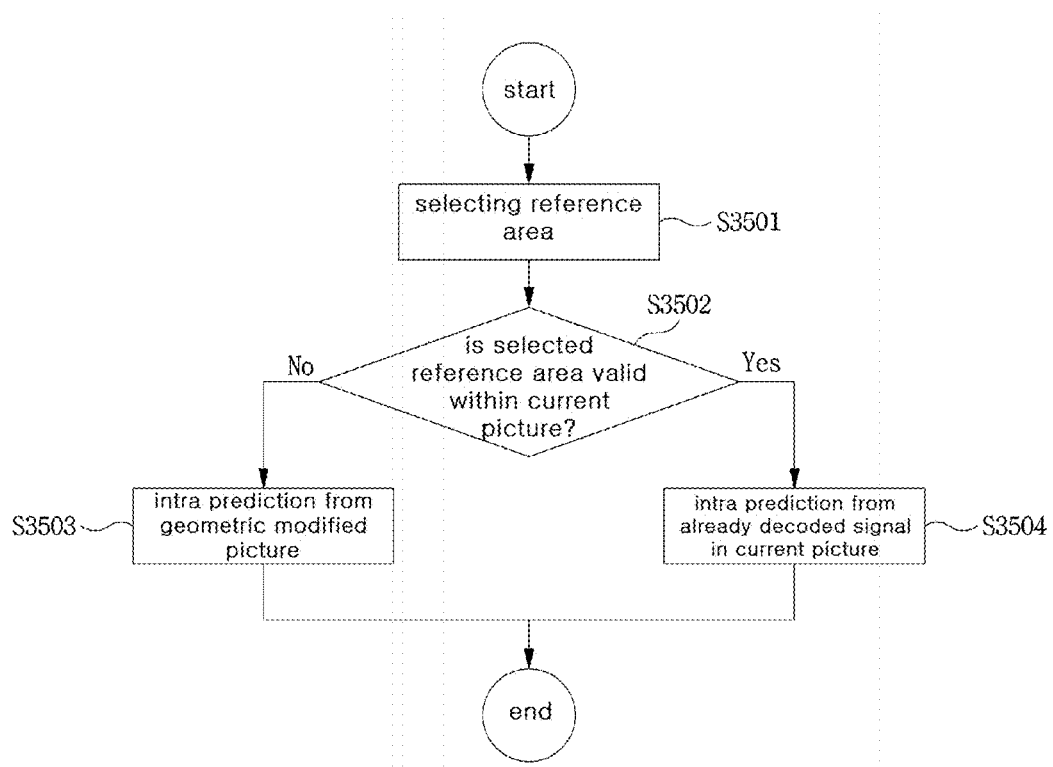
FIG. 35 is a diagram showing extended intra prediction according to an embodiment of the present invention.

FIG. 35 is a diagram showing extended intra prediction according to an embodiment of the present invention.

In step S3501, extended intra prediction selects a reference area that will be used for intra prediction. The reference area may be selected from all directions of a current block. An intra-prediction direction may be expressed as a direction that is subdivided in a predetermined interval, and each of the directions may be expressed as an index. In addition, all other possible representations may be used. An encoder may sequentially or parallel perform intra prediction for the all directions. In a decoder, a single intra-prediction direction may be specified based on intra-prediction information.

In step S3502, extended intra prediction may determine whether or not the reference arca indicated from the intra-prediction direction is valid within the current picture. In other words, if the selected reference arca is placed within an arca that is encoded/decoded before the current block, the reference arca is valid, and if not, the reference area is not valid. The result of step S3502 may be determined by selecting the reference arca in step S3501. For example, a direction, an index, or a direction that indicates the selected reference area by be used for determining whether or not the reference arca is valid.

In step S3504, extended intra prediction may perform intra prediction of the current block by referencing an already decoded signal when the reference area is valid. In step S3503, extended intra prediction may perform intra prediction of the current block by referencing a geometric modified picture when the reference arca is not valid.

FIG. 36 is a diagram showing an intra-prediction direction according to the present invention.

In FIG. 36, prediction modes 0 and 1 are non-angular modes. The prediction mode 0 refers to an intra-planar mode, and the prediction mode 1 refers to a DC mode (Intra-DC). In FIG. 36(1), prediction modes 2 to 34 refer to angular modes. In FIG. 36(2), prediction modes 2 to 65 refer to angular modes. In FIG. 36, arrows may indicate reference signals of intra prediction of the current block.

FIG. 36(1) is a diagram showing intra-prediction directions when an already decoded signal of the current picture may be only referenced. As shown in FIG. 36(1), intra prediction of prediction modes 2 to 34 may only reference a left, an upper, a left-upper, and/or a right-upper signal of the current block.

In FIG. 36(2) is a diagram showing intra-prediction directions when an already decoded signal of the current picture, an already decoded picture, or a geometric modified picture of the already decoded picture may be referenced. As shown in FIG. 36(2), intra prediction of prediction modes 2 to 65 may reference not only a left, an upper, a left-upper, and/or a right-upper signal of the current block, but also a right, a lower, a left-lower and/or a right-lower of the current block.

Figure 37:
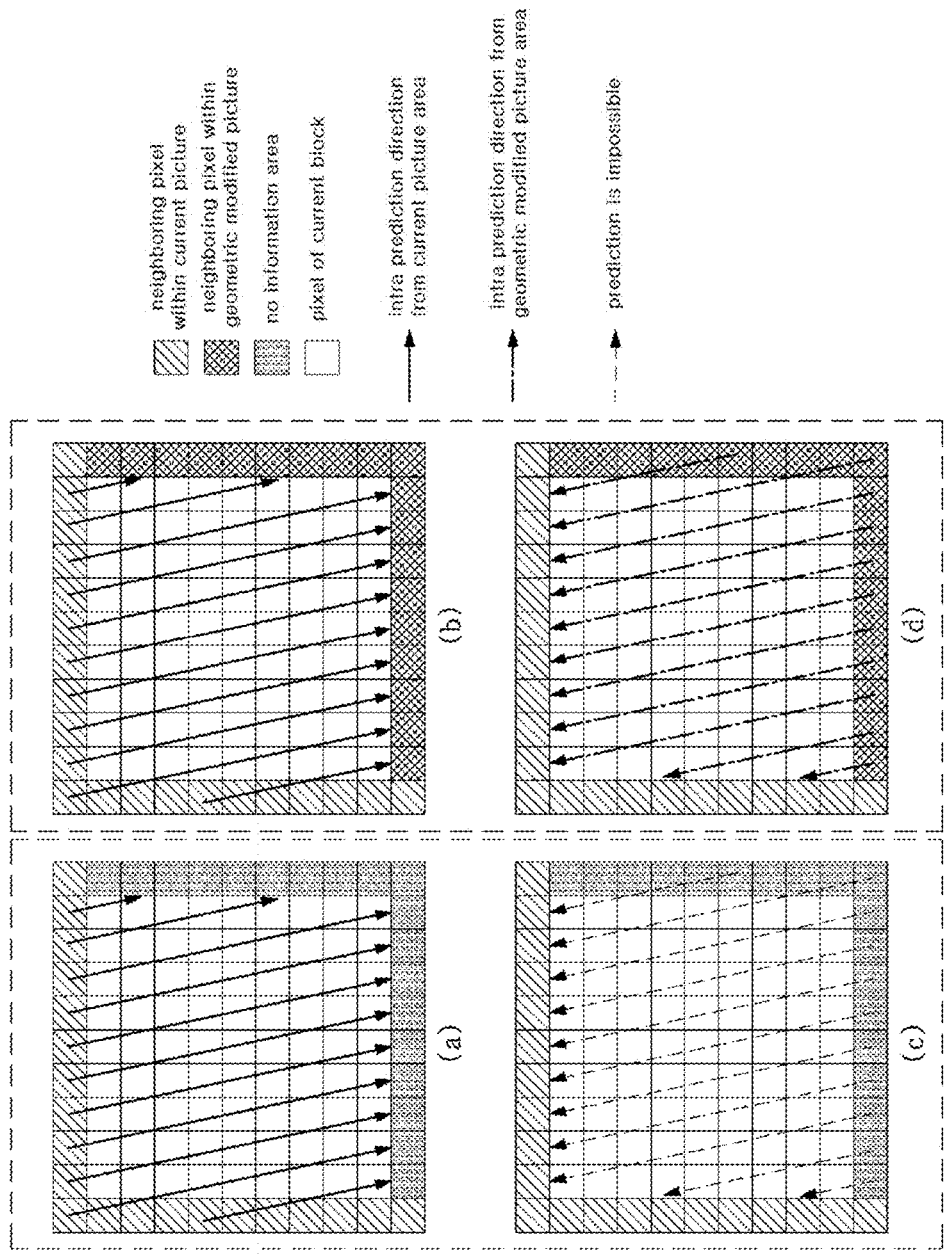
FIG. 37 is a diagram showing an embodiment in which extended intra prediction according to the present invention is performed.

FIG. 37 is a diagram showing an embodiment in which extended intra prediction according to the present invention is performed.

In FIG. 37, a neighboring pixel within a current picture refers to a pixel within the current picture that is referenced while intra prediction is performed. A neighboring pixel within a geometric modified picture refers to a pixel within the geometric modified picture (or reference picture) that corresponds to the current picture. An area without any information refers to an area that does not have pixel information capable of being referenced while intra prediction among the neighboring pixels is performed. The arrows with lines of FIGS. 37(*a*) and 37(*b*) indicate intra-prediction directions when intra prediction is performed by referencing neighboring pixels within the current picture. Herein, the intra-prediction directions may correspond to prediction modes 2 to 34 of FIG. 36. The arrows with doted lines of FIG. 37(*d*) indicate intra-prediction directions when intra prediction is performed by referencing neighboring pixels within the geometric modified picture (or reference picture) that corresponds to the current picture. Herein, the intra-prediction directions may correspond to prediction modes 35 to 65 of FIG. 36. The arrows with doted lines of FIG. 37(*c*) indicate directions that are impossible to intra predict since there are no reference signals.

In FIGS. 37(*a*) and 37(*c*), intra prediction is performed by referencing the neighboring pixels within the current picture. Intra-prediction for the intra-prediction directions shown in FIG. 37(*a*) may be performed since the reference signals are present. However, intra prediction for the intra-prediction directions shown in FIG. 37(*c*) may not be performed since the reference signals are not present.

In FIGS. 37 (*b*) and 37 (*d*), intra prediction is performed by referencing not only the neighboring pixels within the current picture but also the neighboring pixels within the geometric modified picture (or reference picture) that corresponds to the current picture. Intra-prediction for the intra-prediction directions shown in FIG. 37 (*b*) may be performed by referencing the neighboring pixels within the current picture. Intra prediction for the intra-prediction directions shown in FIG. 37 (*d*) may be performed by referencing the neighboring pixels within the geometric modified picture. According to intra prediction of FIGS. 37 (b) and 37 (d), encoding efficiency may be improved by increasing prediction accuracy by performing intra prediction referencing neighboring pixels within the current picture and the neighboring pixels within the geometric modified picture.

According to the present invention, while generating a geometric modified picture, the geometric modified picture may be configured in a coding unit (CU), a prediction unit (PD), a slice unit or an image frame unit. When a change in a pixel value occurs in the image frame unit of the slice unit, it is preferable to generate the geometric modified picture in a large unit such as the slice unit or the image frame unit rather than a small unit such as the CU or PU. Therefore, duplicated geometric modification information that is generated while generating the geometric modified picture in the small unit may be avoided, and it may be much more efficient in terms of complexity. In addition, information whether or not the geometric modified picture is references is included in a frame unit or in a slice unit when the geometric modified picture is not referenced in an area of a frame unit or a slice unit. Thus, an encoder/decoder may not be configured with unnecessary modification information. For example, a picture parameter set (PPS), a syntax configuration, and semantics of the slice header may be applied.

In tables 1 and 2, "modification_image_generation_flag" may be information about whether or not a geometric modified picture is used as a reference picture while predicting motion information. The "modification_image_generation_flag" may be included in a sequence unit, a frame unit, a slice unit, etc. and include information about whether or not the geometric modified picture is used for each unit. When the geometric modified picture is used as the reference picture for each unit, the "modification_image_generation_flag" may be set to '1'. When the geometric modified picture is not used as the reference picture, the "modification_image_generation_flag" may be set to '0'. Alternatively, the "modification_image_generation_flag" may be configured to have opposite values in each case. The "modification_image_generation_flag" may be used as information whether or not geometric modified picture is used in each unit, or as information whether or not the geometric modification information is included in a bitstream.

Tables 1 and 2 are examples of syntax configurations when the each of "modification_image_generation_flag" is signaled through a PPS and a slice header.

TABLE 1

| | Descriptor |
|---|---|
| pic_parameter_set_rbsp( ){ | |
|   pic_parameter_set_id | ue(v) |
|   seq_parameter_set_id | ue(v) |
|   entropy_coding_mode_flag | u(1) |
|   .. | |
|   for(i = 0; i <= num_ref_idx_l0_active_minus1; i++){ | |
|     modification_image_generation_flag | u(1) |
|     if(modification_image_generation_flag){ | |
|       for(j = 0; j <= 8; j++) | |
|       image_modification_info[0][i][j] | ae(v) |
|     } | |
|   } | |
|   if(slice_type == B){ | |
|   for(i = 0; i <= num_ref_idx_l1_active_minus1; i++){ | |
|     modification_image_generation_flag | u(1) |
|     if(modification_image_generation_flag){ | |
|       for(j = 0; j <= 8; j++) | |

TABLE 1-continued

| | Descriptor |
|---|---|
|       image_modification_info[1][i][j] | ae(v) |
|     } | |
|   } | |
| } | |
| ... | |

TABLE 2

| | Descriptor |
|---|---|
| slice_header( ){ | |
|   lightweight_slice_flag | u(1) |
|   if(lightweight_slice_flag){ | |
|   slice_type ue(v) | |
|   pic_parameter_set_id | ue(v) |
|   frame_num | u(v) |
|   ... | |
|   for(i = 0; i <= num_ref_idx_l0_active_minus1; i++){ | |
|     modification_image_generation_flag | u(1) |
|     if(modification_image_generation_flag){ | |
|       for(j = 0; j <= 8; j++) | |
|       image_modification_info[0][i][j] | ae(v) |
|     } | |
|   } | |
|   if(slice_type == B){ | |
|   for(i = 0; i <= num_ref_idx_l1_active_minus1; i++){ | |
|     modification_image_generation_flag | u(1) |
|     if(modification_image_generation_flag){ | |
|       for(j = 0; j <= 8; j++) | |
|       image_modification_info[1][i][j] | ae(v) |
|     } | |
|   } | |
| } | |
| ... | |

"image_modification_info" may be a syntax element related to the geometric modification information and configured with a matrix or non-linear data. The "image_modification_info" may be a syntax element that is present in the bitstream when the geometric modified picture is used in each unit such as the frame unit, the slice unit, etc. (when "modification_image_generation_flag" is 1). Tables 1 and 2 show examples when the "modification_image_generation_flag" has the geometric modification information configured in a matrix form. As described above, the geometric modification information matrix may include 9 coefficients. 8 coefficients may be transmitted since a fixed value may be used for one coefficient among the 9 coefficients. The matrix coefficients to be transmitted may be reduced to 8 or less by an approximation or a prediction of the coefficients. In tables 1 and 2, the matrix coefficients may be transmitted in a form of "image_modification_info [x][y][z]". Herein, x may refer to an index of a reference picture list, y may refer to an index of a reference picture within the reference picture list, and z may refer to an index of the matrix coefficient. Therefore, all reference pictures may respectively have different matrices.

When an encoder determines that the geometric modified picture being configured in a coding unit and/or in a prediction unit is the best case, as shown in tables 3 and 4, "modification_image_generation_flag" and "image_modification_info" may be included as a syntax element of the CO and/or the PU. In tables 3 and 4, the CU may include reference picture information that is referenced by itself, and thus may need single geometric modification information used for geometrically modifying the corresponding reference picture. Therefore, unlikely to the tables 1 and 2, the matrix coefficients may be transmitted in a form of "image_modification_info[z]". Herein, z refers to an index of the matrix coefficient.

Tables 3 and 4 are examples of syntax configurations when each of the "modification_image_generation_flag" and the "image_modification_info" is signaled through the CU and the PU.

TABLE 3

| | Descriptor |
|---|---|
| coding_unit(x0, y0, log2CbSize){ | |
| ... | |
| modification_image_generation_flag | ae(v) |
| if(modification_image_generation_flag){ | |
| for(i = 0; i <= 8; i++) | |
| image_modification_info[i] | ae(v) |
| ... | |

TABLE 4

| | Descriptor |
|---|---|
| prediction_unit(x0, y0, nPbW, nPbH){ | |
| ... | |
| modification_image_generation_flag | ae(v) |
| if(modification_image_generation_flag){ | |
| for(i = 0; i <= 8; i++) | |
| image_modification_info[i] | ae(v) |
| ... | |

When the PPS or the slice header includes information about the geometric modification information as shown in tables 1 and 2, the geometric modification information may not be transmitted in units of the CU or the PU. Therefore, the CU or the PU may be configured as shown in tables 5 and 6. In tables 5, and 6, "modification_image_reference_flag" being 1 may refer that the geometric modified picture is used as a reference signal, or the "modification_image_reference_flag" being 0 may refer that the geometric modified picture is not used as the reference signal. Alternatively, the "modification_image_generation_flag" may be configured to have opposite values in each case. When a geometric modified picture is used as reference information in the CU or the PU (or when the "modification_image_generation_flag" is '1'), the CU or the PU may include "reference_modification_info" that is information necessary for a reference. The information necessary for the reference may include a reference index, a residual signal, etc.

Tables 5 and 6 are examples of syntax configurations when each of the "reference_modification_info" is signaled through the CU and the PU.

TABLE 5

| | Descriptor |
|---|---|
| coding_unit(x0, y0, log2CbSize){ | |
| ... | |
| modification_image_reference_flag) | ae(v |
| if(modification_image_reference_flag){ | |
| reference_modification_info | ae(v) |
| ... | |

TABLE 6

| | Descriptor |
|---|---|
| prediction_unit(x0, y0, nPbW, nPbH){ | |
| ... | |
| modification_image_reference_flag | ae(v) |
| if(modification_image_reference_flag){ | |
| reference_modification_info | ae(v) |
| ... | |

A uni-directional prediction or a bi-directional prediction may be used in motion prediction. When the geometric modified picture is used in motion prediction, a motion prediction type may be signaled in the CU and the PU through syntax configurations of tables 7 and 8.

In detail, the geometric modified picture may be generated by using geometric modification information that is signaled in an upper layer such as a slice header, or PPS. In addition, prediction types such as a bi-directional prediction using a geometric modified picture, a uni-directional prediction using a geometric modified picture, or a prediction not using a geometric modified picture, etc. may be signaled in the CU or the PU. In addition, information about whether or not a geometric modified picture is used for each direction may be signaled through flag information.

In tables 7 and 8, "modification_image_reference_type" may be a flag indicating one of the bi-directional prediction using the geometric modified picture, the uni-directional prediction using the geometric modified picture, or the prediction not using the geometric modified picture. "ref_0_modification_flag" may be a flag indicating whether or not a current decoding picture references a geometric modified picture of a reference picture within a first reference picture list of two reference picture lists. "ref_1_modification_flag" may be a flag indicating whether or not the current decoding picture references a geometric modified picture of a reference picture within a second reference picture list of the two reference picture lists. When "ref_X_modification_flag" is set to be true (1)(herein, X may be 0 or 1), the prediction may be performed by referencing the geometric modified picture of the corresponding reference picture. When "ref_X_modification_flag" is set to be false (0)(herein, X may be 0 or 1), the prediction may be performed by not referencing the geometric modified picture of the corresponding reference picture When "modification_image_modification_type" is "NONE_USE" in the CU or in the PU, predictions for both directions may be performed by not referencing the geometric modified picture of the reference picture by setting the "ref_0_modification_flag" and the ref_1_modification_flag" to be false.

When the "modification_image_modification_type" is "REF_0_USE", a prediction of a list 0 direction may be performed by referencing the geometric modified picture by setting "ref_0_modification_flag" to be true and "ref_1_modification_flag" to be false.

When the "modification_image_modification_type" is "REF_1_USE", a prediction of a list 1 direction may be performed by referencing the geometric modified picture by setting "ref_0_modification_flag" to be false and "ref_1_modification_flag" to be true.

When the "modification_image_modification_type" is "BOTH_USE", predictions for both directions may be performed by referencing the geometric modified picture of the reference picture by setting the "ref_0_modification_flag" and the ref_1_modification_flag" to be true.

Tables 7 and 8 are examples of syntax configurations when each of the "modification_image_reference_type" is signaled through the CU and the PU.

TABLE 7

| | Descriptor |
|---|---|
| coding_unit(x0, y0, log2CbSize){ | |
| ... | |
| modification_image_reference_type | ae(v) |
| if(modification_image_reference_type==NONE_USE){ | |
| ref_0_modification_flag = false | |
| ref_1_modification_flag = false | |
| } | |
| if(modification_image_reference_type==REF_0_USE){ | |
| ref_0_modification_flag = true | |
| ref_1_modification_flag = false | |
| } | |
| if(modification_image_reference_type==REF_1_USE){ | |
| ref_0_modification_flag = false | |
| ref_1_modification_flag = true | |
| } | |
| if(modification_image_reference_type==BOTH_USE){ | |
| ref_0_modification_flag = true | |
| ref_1_modification_flag = true | |
| } | |
| ... | |

TABLE 8

| | Descriptor |
|---|---|
| prediction_unit(x0, y0, nPbW, nPbH){ | |
| ... | |
| modification_image_reference_type | ae(v) |
| if(modification_image_reference_type==NONE_USE){ | |
| ref_0_modification_flag = false | |
| ref_1_modification_flag = false | |
| } | |
| if(modification_image_reference_type==REF_0_USE){ | |
| ref_0_modification_flag = true | |
| ref_1_modification_flag = false | |
| } | |
| if(modification_image_reference_type==REF_1_USE){ | |
| ref_0_modification_flag = false | |
| ref_1_modification_flag = true | |
| } | |
| if(modification_image_reference_type==BOTH_USE){ | |
| ref_0_modification_flag = true | |
| ref_1_modification_flag = true | |
| } | |
| ... | |

As an application example of the present invention, a geometric modified picture that is geometrically modified in an upper layer such as a slice header, PPS, etc. and geometric modification information transmitted from the upper layer may be corrected and used in a CU layer and/or a PU layer. As shown in tables 9 and 10, "modification_image_using_revision_flag" and "modification_revision_info" may be included in the CU layer and/or the PU layer.

The "modification_image_using_revision_flag" being 1 may refer that the CU layer or the PU layer includes information to be corrected. Herein, "modification_revision_info" may be additionally signaled.

The "modification_image_using_revision_flag" being 0 may refer that the CU layer or the PU layer does not include information to be corrected. The "modification_revision_info" may not be signaled since there is no information to be corrected.

The "modification_image_using_revision_flag" and the "modification_revision_info" may be directly signaled as syntax elements as shown in embodiments of tables 9 and 10. Alternatively, "modification_image_using_revision_flag" and the "modification_revision_info" may be explicitly and/or implicitly signaled according to a predetermined rule defined in an encoder and a decoder.

Tables 9 and 10 are examples of syntax configurations when each of "modification_image_using_revision_flag" and "modification_revision_info" is signaled through the CU and the PU.

TABLE 9

| | Descriptor |
|---|---|
| coding_unit(x0, y0, log2CbSize){ | |
| ... | |
| modification_image_using_revision_flag | ae(v) |
| if(modification_image_using_revision_flag){ | |
| modification_revision_info ae(v) | |
| ... | |

TABLE 10

| | Descriptor |
|---|---|
| prediction_unit(x0, y0, nPbW, nPbH){ | |
| ... | |
| modification_image_using_revision_flag | ae(v) |
| if(modification_image_using_revision_flag){ | |
| modification_revision_info | ae(v) |
| ... | |

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The computer-readable storage medium may include a program instruction, a data file, a data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instruction include not only a mechanical language code formatted by a compiler but also a high level language code which may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used for encoding/decoding an image.

The invention claimed is:

1. A method for decoding an image, the method comprising:
receiving a bitstream including a frame header including a plurality of flag syntax elements, each of the plurality of flag syntax elements being associated with a respective one of a plurality of reference pictures, wherein each of the plurality of flag syntax elements indicates whether the frame header includes global geometric modification information syntax elements for an associated reference picture;
if a flag syntax element indicates that the frame header includes global geometric modification syntax elements for a reference picture associated with the flag syntax element, determining a geometric modification type of the reference picture associated with the flag syntax element;
reading, from the frame header, global geometric modification information syntax elements for the reference picture associated with the flag syntax element;
reconstructing geometric modification information for the reference picture associated with the flag syntax element based on the global geometric modification information syntax elements for the reference picture associated with the flag syntax element;
geometrically modifying the reference picture associated with the flag syntax element based on the reconstructed geometric modification information for the reference picture associated with the flag syntax element to generate a prediction block;
obtaining a residual block by performing an inverse-transform on transform coefficients; and
reconstructing a current picture based on the residual block and the prediction block.

2. The method of claim 1, wherein reconstructing the geometric modification information comprises:
reconstructing the geometric modification information further based on previously stored geometric modification information.

3. The method of claim 1, wherein geometrically modifying the reference picture associated with the flag syntax element comprises:
identifying one point within the reference picture associated with the flag syntax element, wherein the one point within the reference picture associated with the flag syntax element corresponds to one point within the prediction block; and
determining pixel information of the prediction block, based on the one point within the reference picture associated with the flag syntax element.

4. The method of claim 3, wherein the geometric modification information represents relationship between the one point within the prediction block and the one point within the reference picture associated with the flag syntax element.

5. The method of claim 3, wherein determining the pixel information of the point within the prediction block comprises:
identifying a plurality of points within the reference picture associated with the flag syntax element based on the one point within the reference picture associated with the flag syntax element, and
determining pixel information of the prediction block, based on pixel information of the plurality of points within the reference picture associated with the flag syntax element.

6. The method of claim 5, wherein when a point of the plurality of points within the reference picture associated with the flag syntax element is nonexistent, a point closest to the nonexistent point is identified.

7. A method for encoding an image, the method comprising:
performing an inter prediction to generate a prediction block for a current block; and
generating a residual block based on the current block and the prediction block;
transforming the residual block to generate transform coefficients;
quantizing the transform coefficients; and
encoding the quantized transform coefficients,
wherein a bitstream further includes a frame header including a plurality of flag syntax elements, each of the plurality of flag syntax elements being associated with a respective one of a plurality of reference pictures, wherein each of the plurality of flag syntax elements indicates whether the frame header includes syntax elements indicating global geometric modification information for an associated reference picture,
wherein, if a flag syntax element indicates that the frame header includes the global geometric modification syntax elements for a reference picture associated with the flag syntax element, the frame header further includes a syntax element for a geometric modification type and syntax elements indicating the global geometric modification information for the reference picture associated with the flag syntax element,
wherein the inter prediction is performed based on the global geometric modification information.

8. A non-transitory computer-readable storage medium for storing instructions that, when executed by a processor, cause the processor to:
read, from a frame header included in a bitstream, a plurality of flag syntax elements, each of the plurality of flag syntax elements being associated with a respective one of a plurality of reference pictures, wherein each of the plurality of flag syntax elements indicates whether the frame header includes global geometric modification information syntax elements for an associated reference picture;
if a flag syntax element indicates that the frame header includes global geometric modification syntax elements for a reference picture associated with the flag syntax element, determine a geometric modification type of the reference picture associated with the flag syntax element;

read, from the frame header, global geometric modification information syntax elements for the reference picture associated with the flag syntax element;

reconstruct geometric modification information for the reference picture associated with the flag syntax element based on the global geometric modification information syntax elements for the reference picture associated with the flag syntax element;

geometrically modify the reference picture associated with the flag syntax element based on the reconstructed geometric modification information for the reference picture associated with the flag syntax element to generate a prediction block; and obtaining a residual block by performing an inverse-transform on transform coefficients; and reconstructing a current picture based on the residual block and the prediction block.

* * * * *